United States Patent [19]

Sumita et al.

[11] Patent Number: 5,765,179

[45] Date of Patent: Jun. 9, 1998

[54] LANGUAGE PROCESSING APPLICATION SYSTEM WITH STATUS DATA SHARING AMONG LANGUAGE PROCESSING FUNCTIONS

[75] Inventors: Kazuo Sumita; Akira Kumano; Hiroshi Kanazawa, all of Kanagawa-ken, Japan

[73] Assignee: Kabushiki Kaisha Toshiba, Kawasaki, Japan

[21] Appl. No.: 475,688

[22] Filed: Jun. 7, 1995

[30] Foreign Application Priority Data

Aug. 26, 1994 [JP] Japan .................. 6-201210

[51] Int. Cl.$^6$ .................................................. G06F 17/00
[52] U.S. Cl. ........................................................ 707/530
[58] Field of Search ............................ 395/751–760, 395/792–798; 707/530–536

[56] References Cited

U.S. PATENT DOCUMENTS

| 5,333,236 | 7/1994 | Bahl et al. ........................... 395/2.65 |
| 5,333,266 | 7/1994 | Boaz et al. ........................... 395/200 |
| 5,568,383 | 10/1996 | Johnson et al. .................. 364/419.02 |

OTHER PUBLICATIONS

P.H. Winston, "Control Metaphors", Artificial Intelligence, 2nd Ed., Addison–Wesley Publishing Company, Inc., pp. 136–161, 1984.

Primary Examiner—Almis R. Jankus
Attorney, Agent, or Firm—Foley & Lardner

[57] ABSTRACT

A language processing application system capable of operating a plurality of language processing functions on different computer systems while improving a performance level of each language processing function. In the system, mutually different language processing functions are provided by a plurality of language processing servers, and status data obtained in a course of a language processing by each language processing server is managed at a status data management unit, where the status data indicates at least a part of features of input data processed by each language processing server. Each language processing server acquires the status data obtained in a course of a language processing by another language processing server from the status data management unit and adjusts its language processing according to the status data acquired from the status data management unit.

26 Claims, 25 Drawing Sheets

FIG. 13

| Sumita |
|---|
| Voice IF |
| Voice Recog |
| Background Noise |
| 60 |

# LANGUAGE PROCESSING APPLICATION SYSTEM WITH STATUS DATA SHARING AMONG LANGUAGE PROCESSING FUNCTIONS

BACKGROUND OF THE INVENTION

1. Field of the Invention

The present invention relates to a language processing application system utilizing a plurality of language processing functions operable on separate computers.

Here, a term language processing is used as a generic concept encompassing various information conversion and information recognition functions based on a plurality of language processing functions such as a machine translation, an automatic summary generation, an information retrieval, a kana-kanji conversion, a speech recognition, an optical character recognition (OCR), a full text retrieval using OCR function, etc.

2. Description of the Background Art

Recently, in conjunction with the development of a high speed and large capacity computer network, there is progress toward a realization of various types of an information systems for sharing computer resources such as a memory resource, a CPU resource, a device resource, etc. distributed on the computer network. In the future, different types of computers with different types of operating systems such as personal computers, engineering work stations, and super computers will be connected to such a computer network, and a considerable increase in demand for an organic connection and utilization of a plurality of information processing functions operating on different types of computers is expected.

A major advantage of realizing such a system operable under distributed computer environment lies in the fact that it becomes easier to organically connect a plurality of information processing functions operating on different systems, so that it becomes possible to realize a totally new information processing application system. Another significant advantage of such a system is that there will be no need to spend time and cost for implementing the identical functions on other computer systems or operating systems.

Under such circumstances, regarding a conventional language processing application system of a kind to which the present invention is directed, most of the conventional systems are operable only on a single computer, so that computer systems and operating systems that can be used in such a conventional system have been severely limited.

Moreover, many of the conventional systems adapted to the distributed computer environment are made to be operable on the other computers by merely separating the graphical user interface section adapted to the network. In this type of conventional system, the processing unit related to the essence of the language processing is closed within one computer system, and an organic connection of the other language processing system has not been realized yet. In this regard, by operating different language processing systems on different computers through a computer network, a considerable reduction of time and cost for a system development can be expected.

On the other hand, the conventional language processing systems for machine translation, kana-kanji conversion, automatic summary generation, document retrieval, etc. have been realized as separate processing systems, and there has been a need to manage dictionary data, user customization data, etc. separately.

For example, in an exemplary case concerning an English-Japanese machine translation system having a post-editor, the language processing application system is going to have a plurality of language processing systems including a kana-kanji conversion system and an English-Japanese machine translation system. In this type of conventional system, even when a certain word-translation pair is registered into a dictionary of the English-Japanese machine translation system, this information will not be registered into a dictionary of the kana-kanji conversion system. Consequently, there has been a need to register that certain word into a dictionary of the kana-kanji conversion system separately, and the user has been required to spend much time and effort for this purpose.

In other words, it is impossible to take a full advantage of the language processing application system utilizing a plurality of language processing systems as long as each language processing system is operated separately.

SUMMARY OF THE INVENTION

It is therefore an object of the present invention to provide a language processing application system connecting and utilizing a plurality of language processing functions, capable of operating these language processing functions on different computer systems, and Improving a performance level of each language processing function by sharing status data such as user customization data, dictionary data, field data, etc. among these language processing functions.

According to one aspect of the pre sent invention there is provided a language processing application system, comprising: a plurality of language processing servers for providing mutually different language processing functions; and status data management means for managing status data obtained in a course of language processing by each language processing server, the status data indicating at least one of the features of input data processed by said each language processing server; wherein each language processing server acquires the status data obtained in the course of a language processing by another language processing server from the status data management means and adjusts the language processing by said each language processing server according to the status data acquired from the status data management means.

According to another aspect of the present invention there is provided a language processing application method, comprising the steps of: providing mutually different language processing functions by a plurality of language processing servers; managing status data obtained in the course of language processing by each language processing server at the status data management means, the status data indicating at least one of the features of input data processed by said each language processing server; and acquiring at each language processing server the status data obtained in the course of language processing by another language processing server from the status data management means; and adjusting language processing by said each language processing server according to the status data acquired from the status data management means.

Other features and advantages of the present invention will become apparent from the following description taken in conjunction with the accompanying drawings.

BRIEF DESCRIPTION OF THE DRAWINGS

FIG. 13 is a diagrammatic illustration of an exemplary status data used in the language processing application system of FIG. 10.

DETAILED DESCRIPTION OF THE PREFERRED EMBODIMENTS

Referring now to FIG. 1 to FIG. 9, the first embodiment of the language processing application system according to the present invention will be described in detail.

Figure 1:
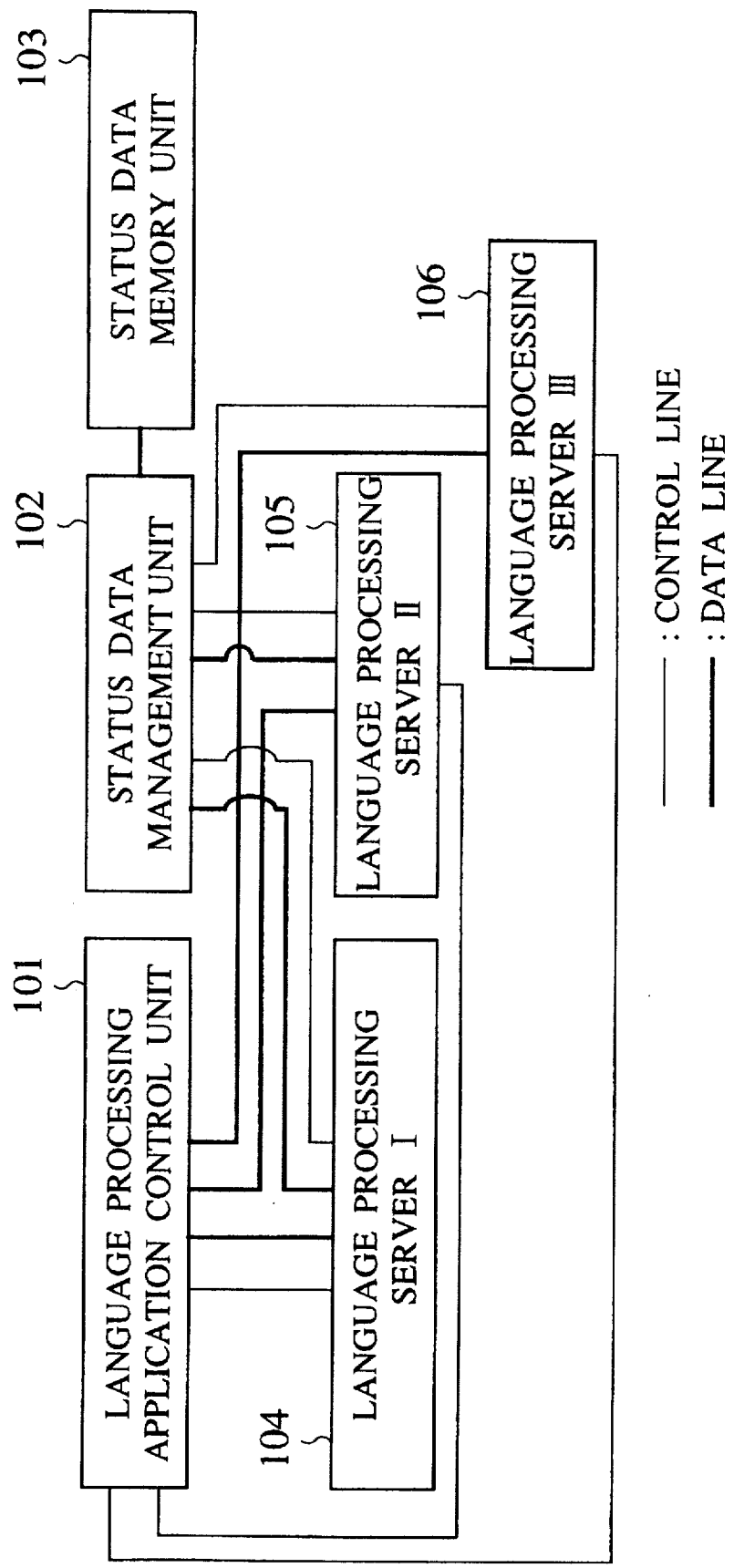
FIG. 1 is a block diagram of a functional configuration of the first embodiment of a language processing application system according to the present invention.

In this first embodiment, the language processing application system has a functional configuration as shown in FIG. 1, which comprises a plurality of language processing servers 104-106 for providing mutually different language processing functions, a status data memory unit 103 for storing status data to be explained below, a status data management unit 102 for controlling update of the status data stored in the status data memory unit 103, and a language processing application control unit 101 for controlling the language processing servers 104-106 so as to realize an overall language processing application. In this FIG. 1, control lines among the elements are represented by thin lines while data lines among the elements are represented by thick lines.

Figure 2:
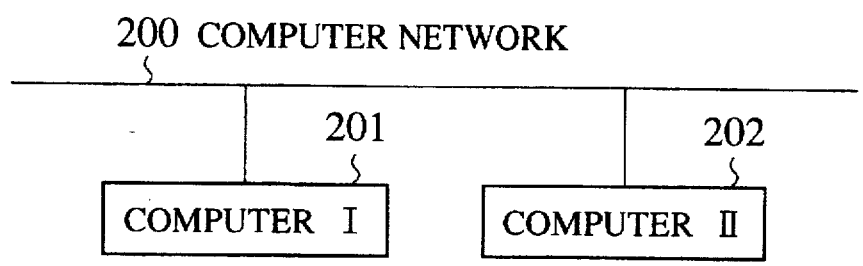
FIG. 2 is a schematic block diagram of a physical configuration of the language processing application system of FIG. 1.

This language processing application system can be realized in an exemplary physical configuration as shown in FIG. 2, in which a plurality of computers 201-202 are mutually connected through a computer network 200. In an exemplary case of realizing the language processing application control unit 101 on the computer-I 201 while realizing the language processing server-I 104, the language processing server-II 105, and the language processing server-III 106 are operating on the computer-II 202, the language processing application provided by this system is going to realize a desired application function by properly using appropriate ones of various language processing functions provided by the language processing servers operating on the computer-II 202 according to the need.

Figure 3:
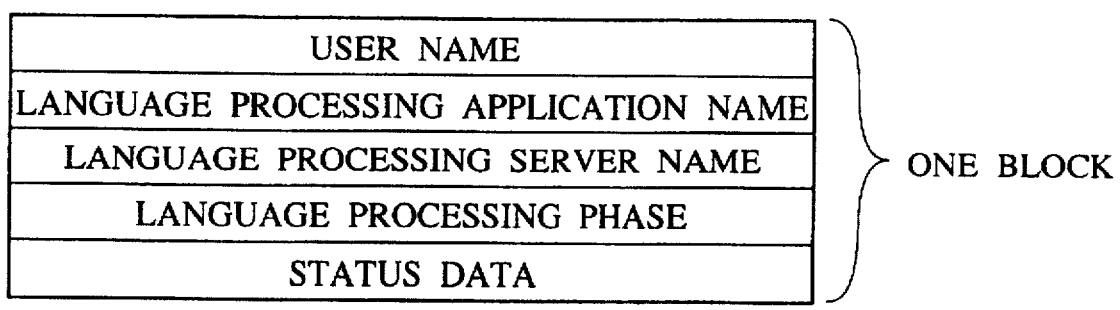
FIG. 3 is a diagrammatic illustration of a format for status data used in the language processing application system of FIG. 1.

In this first embodiment, each language processing server sends/acquires the status data in a format shown in FIG. 3 to/from the status data management unit 102. Here, the status data is expressed in units of blocks, where as shown in FIG. 3, each block includes a name of a user who is using this system, a name of a language processing application which is using the language processing server which generated this status data, a name of a language processing server which generated this status data, a phase of the language processing made by this language processing server, and the status data itself. The status data management unit 102 registers and manages the status data in the status data memory unit 103 in units of such blocks.

In the present invention, the status data itself is an intermediate data obtained or generated in a course of the language processing at each language processing server, which defines a part of features of input data processed by each language processing server either numerically or symbolically. The concrete examples of this status data will be illustrated in the subsequent embodiments described below.

Figure 4:
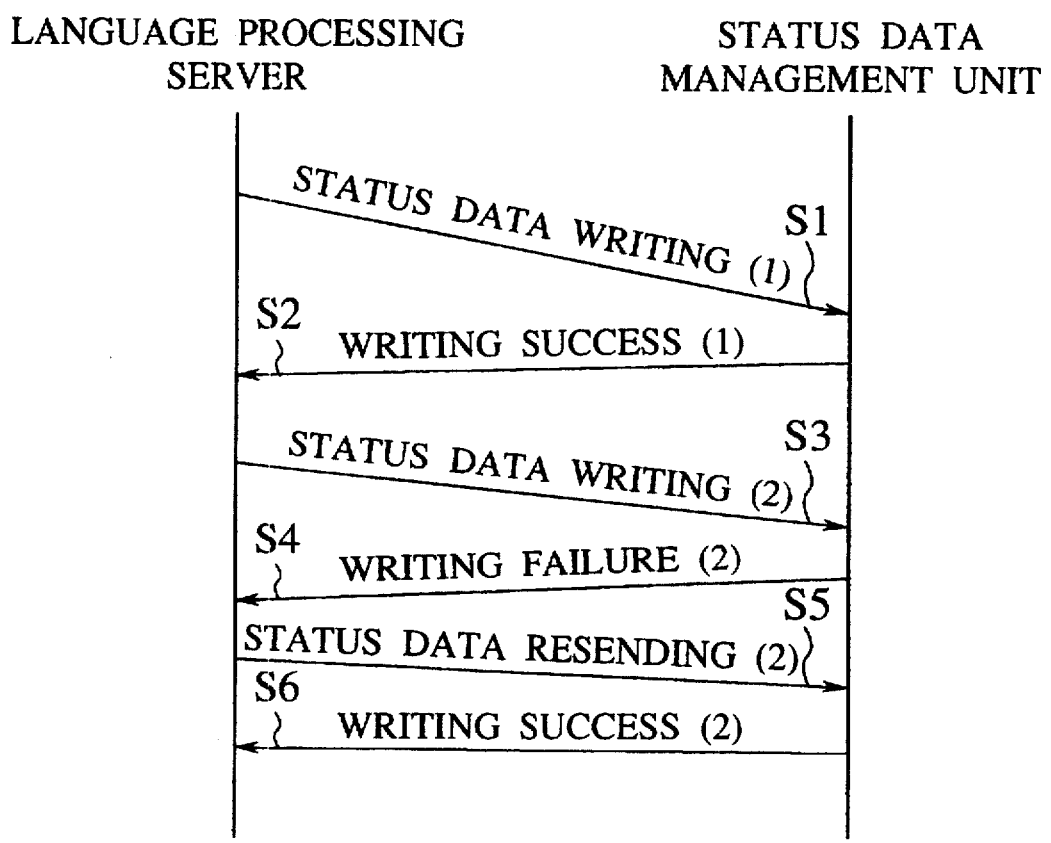
FIG. 4 is a sequence chart of a procedure for status data writing in the language processing application system of FIG. 1.
Figure 5:
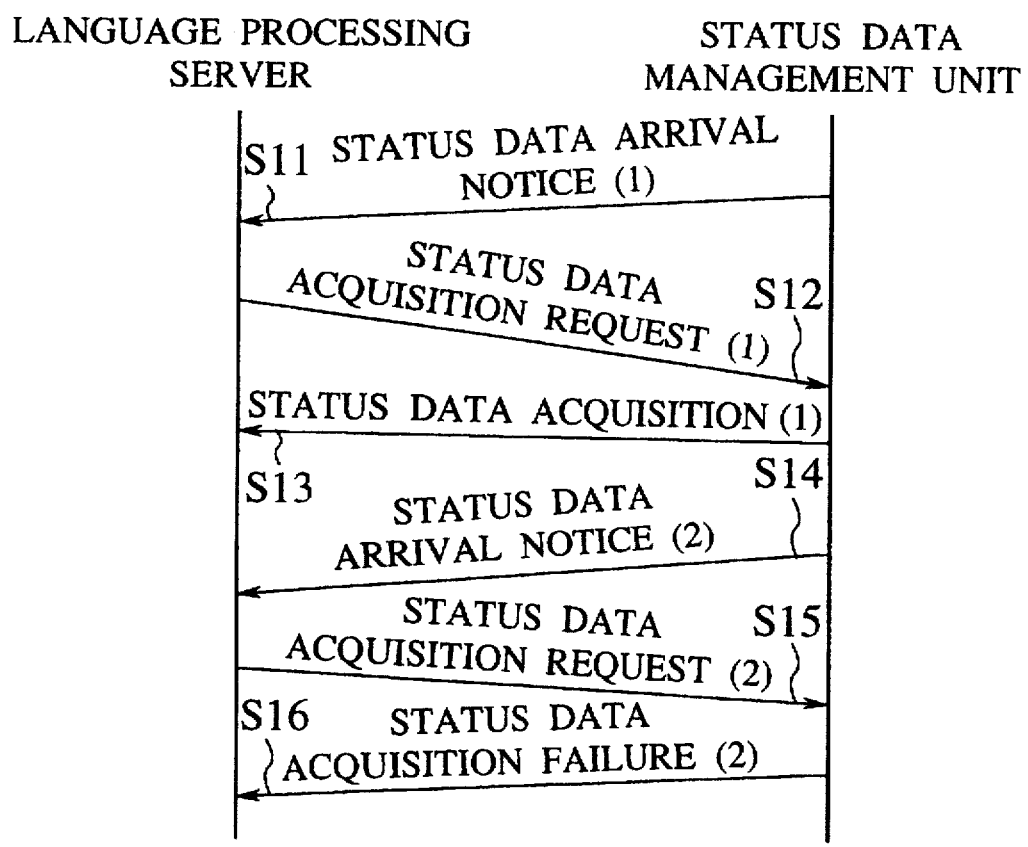
FIG. 5 is a sequence chart of a procedure for status data acquisition in the language processing application system of FIG. 1.

In the configuration of FIG. 1, each language processing server sends the status data to the status data management unit 102 according to a procedure shown in FIG. 4, while each language processing server acquires the status data from the status data management unit 102 according to a procedure shown in FIG. 5, as follows.

Namely, at a time of sending the status data from each language processing server to the status data management unit 102, each language processing server carries out the status data writing with respect to the status data management unit 102 (S1) first. When this writing is successfully completed, the status data management unit 102 notifies the writing success to this language processing server (S2), and the status data writing process is completed.

On the other hand, after the status data writing (S3), when the writing is unsuccessful for some reason such as a shortage of memory region in the status data memory unit 103, the status data management unit 102 notifies the writing failure to this language processing server (S4). Then, this language processing server resend the same status data (S5), until the writing success is notified from the status data management unit (S6).

Also, at a time of acquiring the status data from the status data management unit 102 at each language processing server, the status data management unit 102 broadcasts a status data arrival notice with respect to all the language processing servers of the system whenever a new status data is received (S11). Then, each language processing server issues a status data acquisition request to the status data management unit 102 (S12), in response to which the status data management unit 102 transfers the requested status data to the requesting language processing server (S13).

On the other hand, after the status data arrival notice is broadcasted (S14) and the status data acquisition request (S15), when the acquisition of the requested status data is unsuccessful for some reason such as a non-existence of the requested status data in the status data memory unit 103, the status data management unit 102 notifies the status data acquisition failure to the requesting language processing server (S16).

Figure 6:
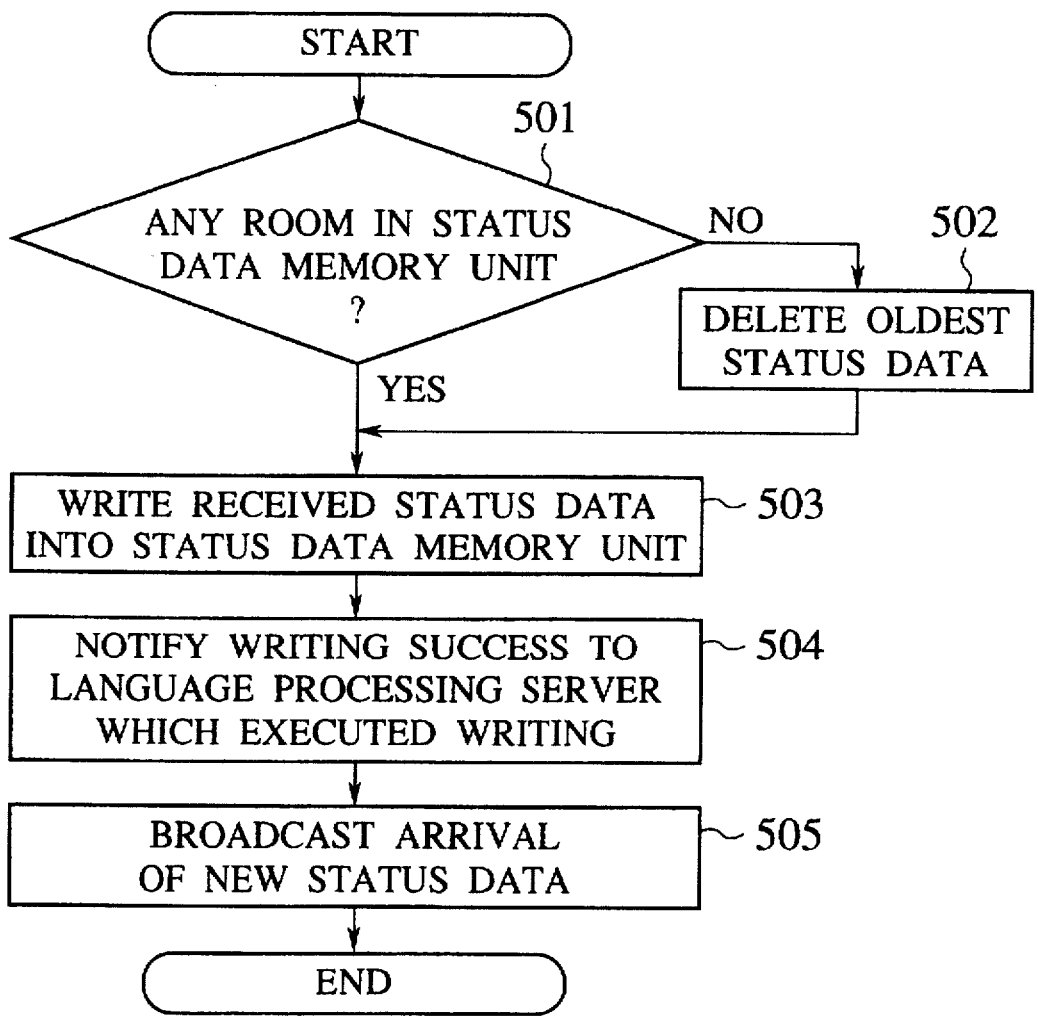
FIG. 6 is a flow chart for an operation of a status data management unit in the language processing application system of FIG. 1 at a time of receiving status data.
Figure 7:
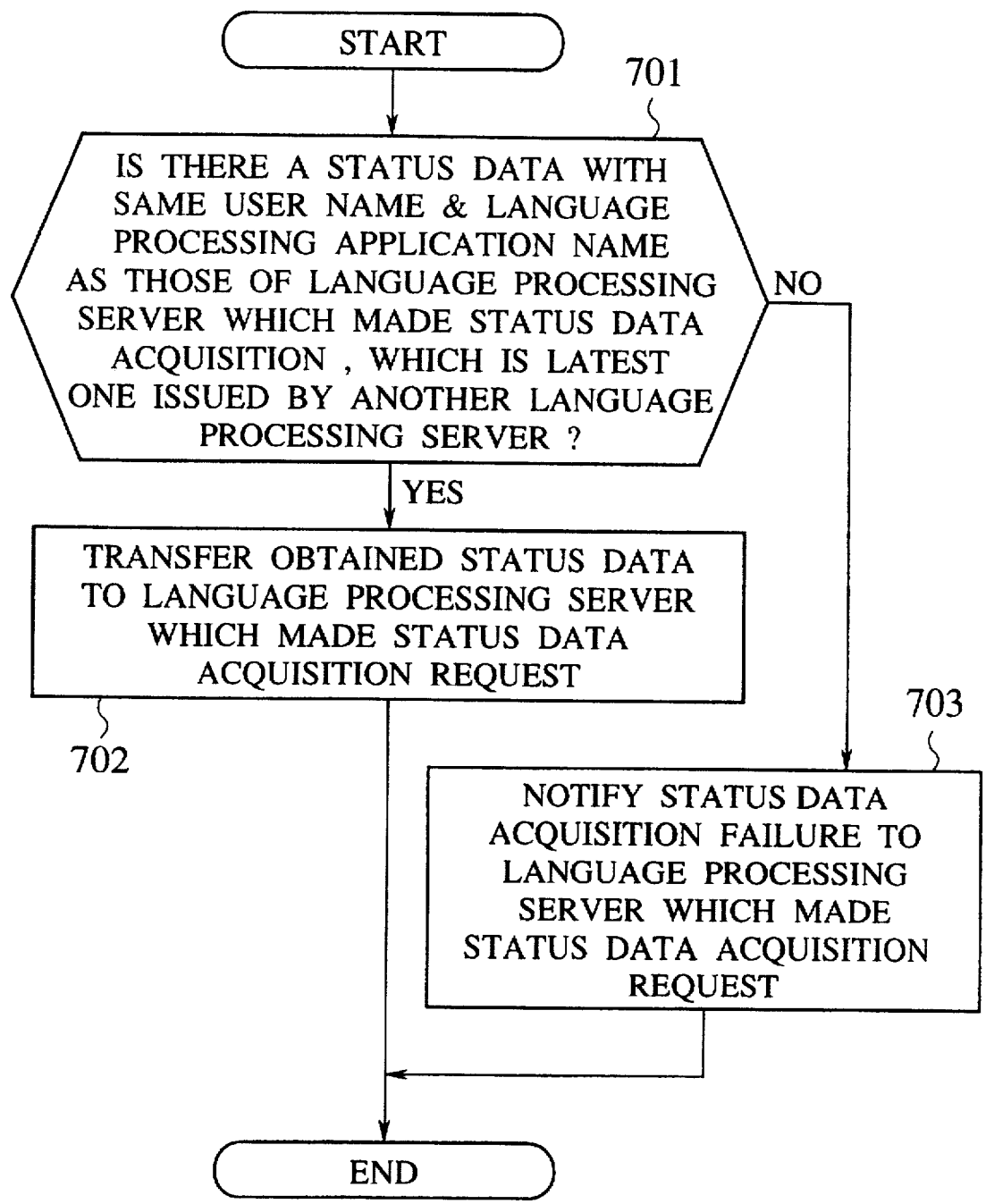
FIG. 7 is a flow chart for an operation of a status data management unit in the language processing application system of FIG. 1 at a time of receiving status data acquisition request.

In the configuration of FIG. 1, the status data management unit 102 operates according to the flow chart of FIG. 6 when the status data is received from the language processing server, or according to the flow chart of FIG. 7 when the status data acquisition request is received from the language processing server. Here, it is assumed that the status data memory unit 103 stores the status data in a format of FIG. 3 in the queue structure such that the latest status data is placed at a top of the queue while the older status data are sequentially shifted down toward the end of the queue. In this case, when the status data memory unit 103 runs out of the memory region, the oldest status data is deleted to make room for a new status data, so as to avoid the writing failure.

According to FIG. 6, when a new status data is received, the status data management unit 102 checks whether there is any room in the status data memory unit 103 or not (501), and deletes the oldest status data when there is no room (502). Then, the status data management unit 102 writes this received new status data into the status data memory unit 103 (503), and notifies the writing success to the language processing server which executed this status data writing (504), while broadcasting the status data arrival notice indicating the arrival of this new status data to all the language processing servers (505).

According to FIG. 7, when a status data acquisition request is received, the status data management unit 102 checks whether there exists a status data which has the same user name and language processing application name as those of the user and the language processing application using the language processing server which made this status data acquisition request, and which is the latest status data issued by another language processing server different from this requesting language processing server, among the status data stored in the status data memory unit 103 (701).

Then, when such a status data is found, this status data is transferred to the language processing server which made this status data acquisition request (702), whereas when such a status data is not found, the status data acquisition failure is notified to the language processing server which made this status data acquisition request (703), and the operation is terminated.

Figure 8:
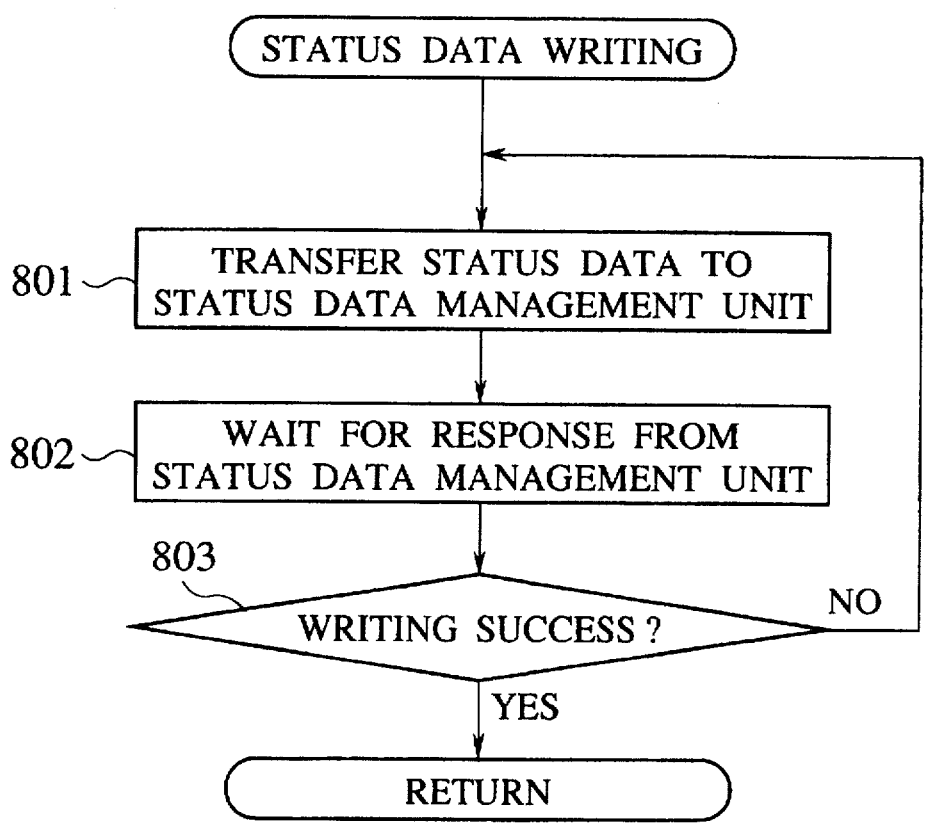
FIG. 8 is a flow chart for an operation of each language processing server in the language processing application system of FIG. 1 at a time of status data writing.
Figure 9:
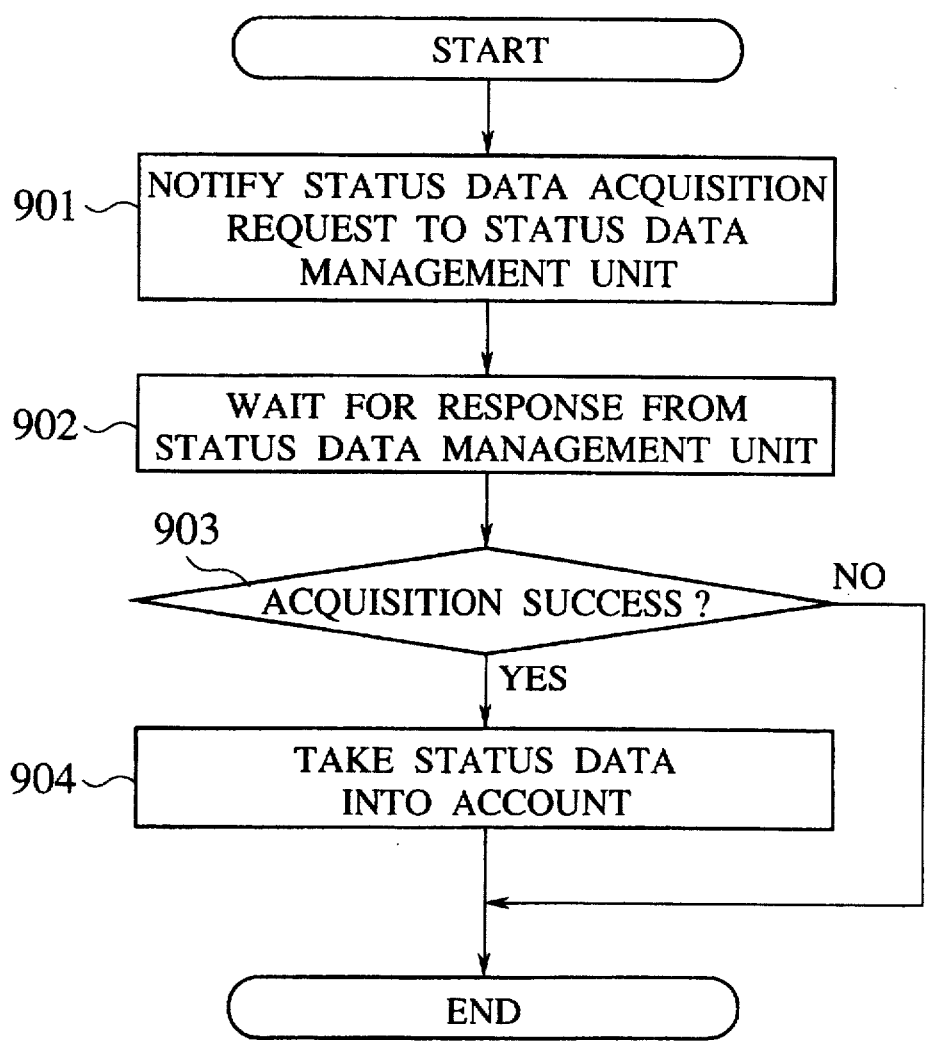
FIG. 9 is a flow chart for an operation of each language processing server in the language processing application system of FIG. 1 at a time of receiving status data arrival notice.

On the other hand, each language processing server operates according to the flow chart of FIG. 8 at a time of writing the status data, or according to the flow chart of FIG. 9 at a time of acquiring the status data. These FIGS. 8 and 9 only show the operation of each language processing server related to the writing or the acquiring of the status data, and the other operation related to a specific language processing function of each language processing server is omitted as it is not an essential feature of this first embodiment.

According to FIG. 8, at a time of the status data writing, each language processing server transfers the status data to be written to the status data management unit 102 (801), and awaits for a response from the status data management unit 102 (802). Then, the operation is terminated when the writing success is notified from the status data management unit 102 in response (803 YES), whereas otherwise (803 NO), the operation returns to the step 801 to resend the status data to be written.

According to FIG. 9, at a time of the status data acquisition request after the status data arrival notice is received, each language processing server notifies the status data acquisition request to the status data management unit 102 (901), and awaits for a response from the status data management unit 102 (902). Then, in a case of the status data acquisition success (903 YES), the requested status data transferred from the status data management unit 102 is taken into account in the language processing at this language processing server (904), whereas otherwise (903 NO), the operation is terminated.

In the above description of this first embodiment, it is assumed that the status data memory unit 103 stores the status data in a format of FIG. 3 in the queue structure, but it is also possible to set up a field for registering a time at which each status data is newly stored in each block of the status data, in which case there is no need to use the queue structure.

In a case of managing the status data according to the registration time, in the operation of the status data management unit 102 at a time of receiving the status data from each language processing server as shown in FIG. 6, the deletion of the old status data can be modified as follows.

(1) The status data with the oldest registration time is deleted.

(2) The status data for which a prescribed period of time has elapsed since the registration time is deleted.

In a case of (2), there is no guarantee that there is a room for writing a new status data in the status data memory unit 103 at a time of the writing of a new status data. Consequently, when the writing failure occurs, there is a need to notify this writing failure to the language processing server.

Also, in the operation of each language processing server at a time of the status data writing as shown in FIG. 8, the status data is resend as many times as necessary until the writing succeeds, but it is possible to modify this operation such that the operation is terminated after the status data is resend for a prescribed number of times, so as to avoid an occurrence of the dead lock in this operation.

It is also noted that, instead of providing the status data management unit 102 for managing the status data as described above, it is easily possible to modify this first embodiment to realize the direct exchanges of the status data among the language processing servers.

As described, in this first embodiment, the status data obtained by one language processing server can be shared by the other language processing server, so that the performance level of each language processing function can be improved by reflecting the information provided by the status data obtained by the other language processing function into each language processing function.

This first embodiment is a generic embodiment concerning the language processing application not limited to any specific language processing, which serves as an underlying basic framework for the subsequent embodiments concerning more specific language processing functions.

Referring now to FIG. 10 to FIG. 13, the second embodiment of the language processing application system according to the present invention in a form of a speech dialogue system will be described in detail.

Figure 10:
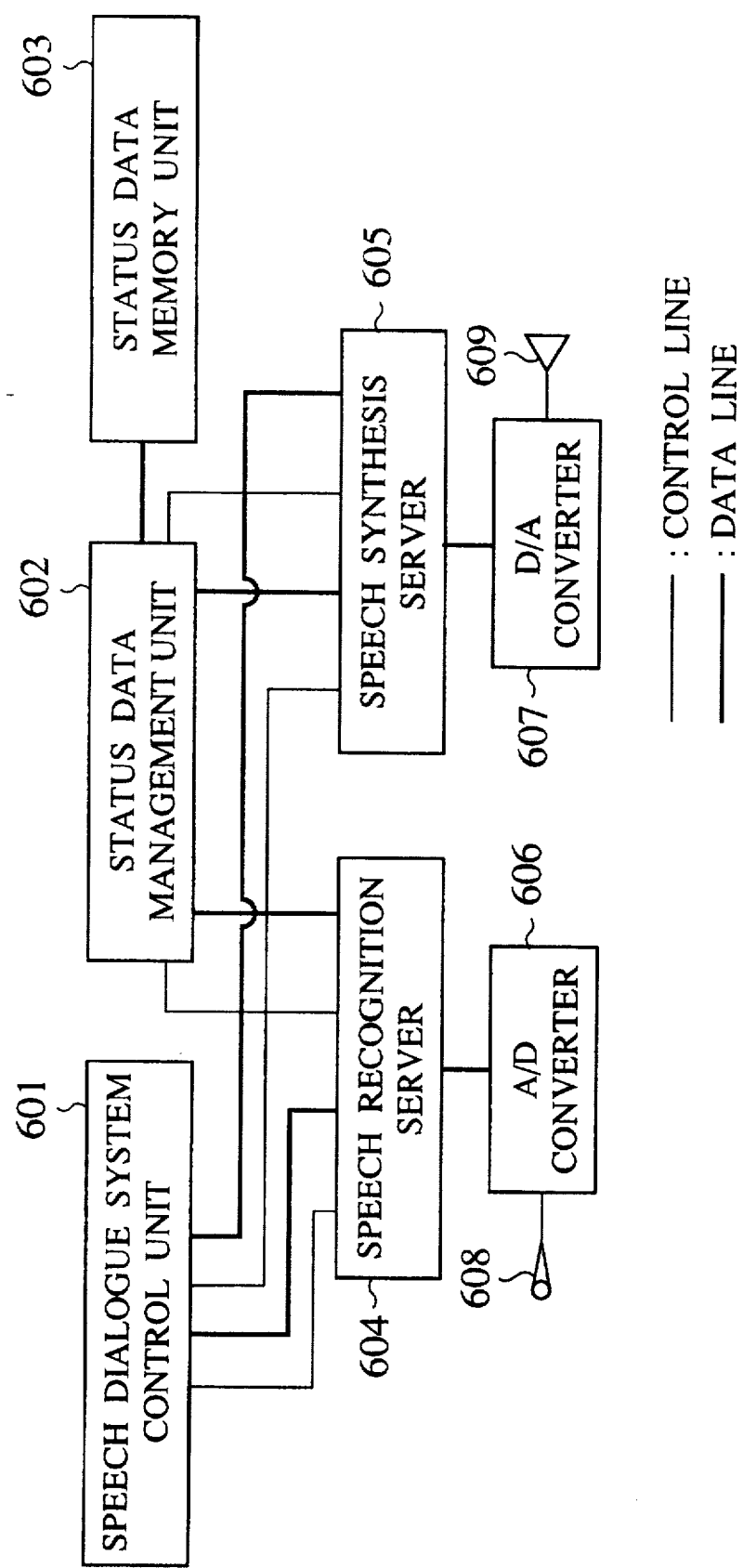
FIG. 10 is a block diagram of a functional configuration of the second embodiment of a language processing application system according to the present invention.

As shown in FIG. 10, the speech dialogue system of this second embodiment comprises a speech recognition server 604 and a speech synthesis server 605 as the specific language processing servers, a speech dialogue system control unit 601 for controlling this speech dialogue system as a whole, a status data management unit 602 and a status data memory unit 603 similar to those of the first embodiment described above, an A/D converter 606 connected to the speech recognition server 604 for converting speech analog signals entered from a microphone 608 into digital signals, and a D/A converter 6-7 connected to the speech synthesis server 605 for converting digital signals outputted by the speech synthesis server 605 into speech analog signals to be outputted from a loudspeaker 609.

Here, the details of the processing related to the speech recognition and speech synthesis functions to be provided by the speech recognition server 604 and the speech synthesis server 605 are not essential features of this second embodiment, and it is possible to utilize the known speech recognition and speech synthesis functions such as the speech recognition scheme using the measurement of a power of speech input signals and the speech synthesis scheme capable of controlling a power of the synthesized speech signals for example.

Also, the functions of the speech dialogue system control unit 601 related to the speech recognition and speech synthesis functions themselves are not essential features of this second embodiment, and it is possible to utilize the known control scheme, so that only the functions related to the acquisition and utilization of the status data characteristic to the present invention will be described for this speech dialogue system control unit 601 in the following.

Figure 11:
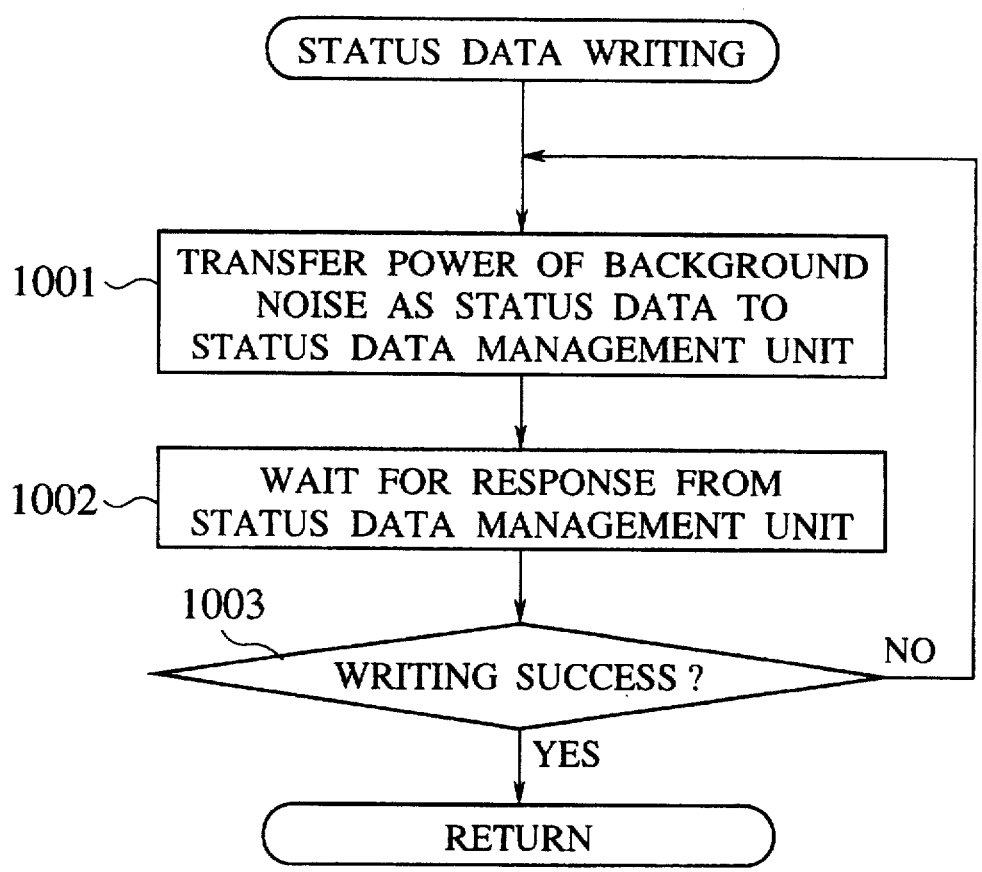
FIG. 11 is a flow chart for an operation of a speech recognition server in the language processing application system of FIG. 10 at a time of status data writing.

In relation to the acquisition and utilization of the status data, the speech recognition server 604 operates according to the flow chart of FIG. 11, while the speech synthesis server 605 operates according to the flow chart of FIG. 12, as follows.

At the speech recognition server 604, for the purpose of the speech recognition processing, a power of sound volume for the input signal entered from the microphone 608 and A/D converted by the A/D converter 606 is measured, and a timing point at which the measured power exceeds a prescribed power level is set as a starting edge of the speech input, while a timing point at which the measured power becomes lower than the prescribed power level is set as an ending edge of the speech input.

Then, the speech recognition processing is applied to a speech section defined between these starting and ending edges. FIG. 11 shows an operation for transmitting the power of the background noise as the status data to the status data management unit 602, which is activated at a time of the detection of the starting edge. In this operation, an average power of the input at a prescribed section immediately before the staring edge of the speech section is obtained as the power of the background noise, and transferred to the status data management unit 602.

More specifically, the power of the background noise is obtained as an average power of the input at a prescribed section immediately before the starting edge of the speech section, and a value of this power is transferred to the status data management unit 602 as the status data (1001). Then, a response from the status data management unit 602 is awaited (1002), and the operation is terminated when the writing success is notified from the status data management unit 602 in response (1003 YES), whereas otherwise (1003 NO), the operation returns to the step 1001.

Figure 12:
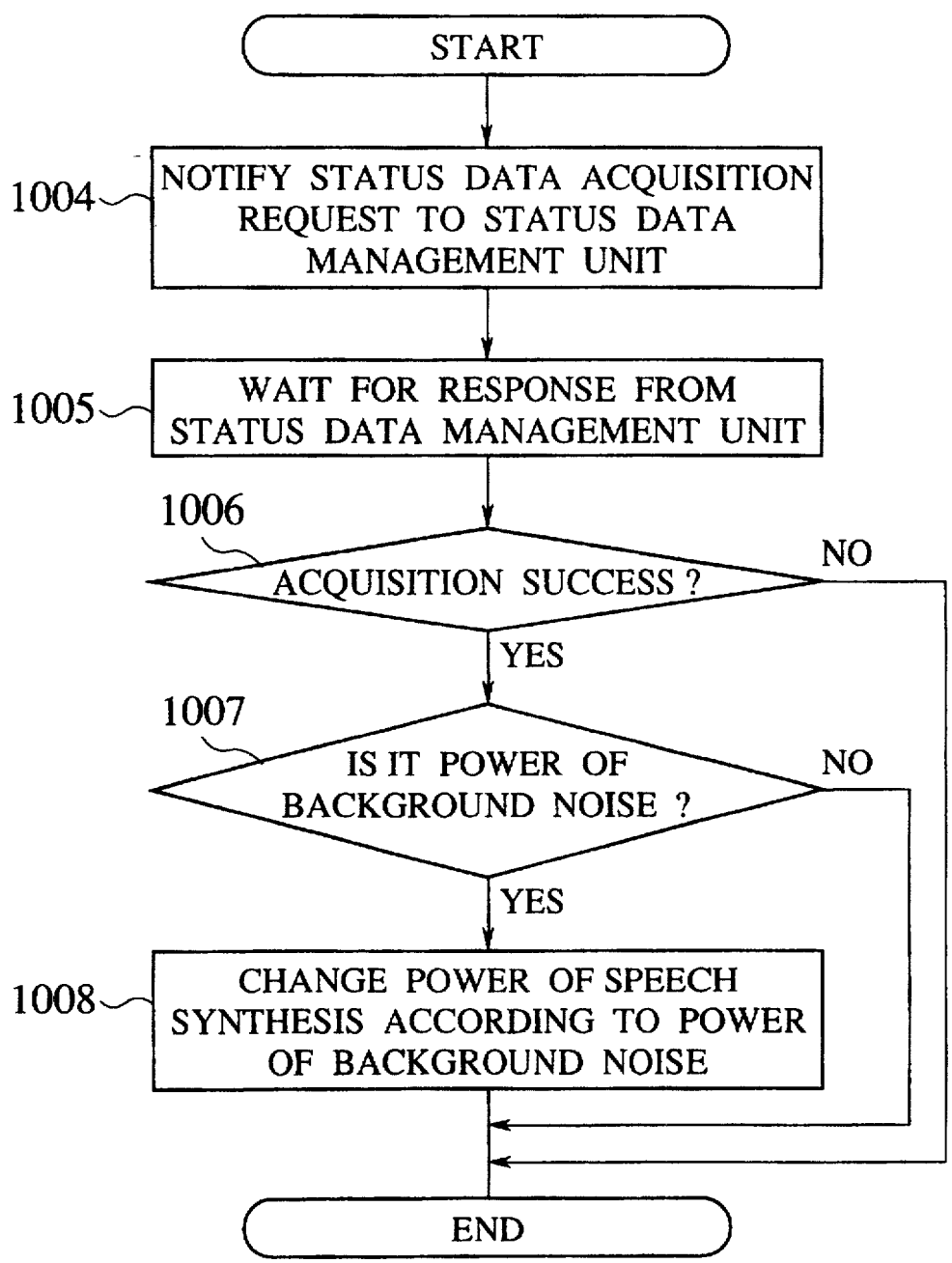
FIG. 12 is a flow chart for an operation of a speech synthesis server in the language processing application system of FIG. 10 at a time of receiving status data arrival notice.

At the speech synthesis server 605, when the status data arrival notice is received from the status data management unit 602, the operation of FIG. 12 is carried out as an interruption processing as follows. Namely, the speech synthesis server 605 notifies the status data acquisition request to the status data management unit 602 (1004), and awaits for a response from the status data management unit 602 (1005). Then, in a case of the status data acquisition success (1006 YES), whether the requested status data transferred from the status data management unit 602 indicates the power of the background noise or not is judged by checking a field of language processing phase provided in the status data (1007). When the received status data indicates the power of the background noise (1007 YES), the power of the speech synthesis is changed according to the power of the background noise indicated by the received status data (1008) and the operation is terminated, whereas when the status data acquisition is unsuccessful (1006 NO) or when the received status data does not indicate the power of the background noise (1007 NO), the operation is terminated immediately.

In this second embodiment, the status data to be registered into the status data memory unit 603 by the speech recognition server 604 has an exemplary format as shown in FIG. 13. Namely, a field of user name has a user name of "Sumita", a field of language processing application name has a language processing application name of "Voice IF", a field of language processing server name has a language processing server name of "Voice Recog", a field of language processing phase has a language processing phase of "Background Noise", and a field of status data has a status data of "60". This status data of FIG. 13 indicates that a user called "Sumita" is using the language processing server called "Voice Recog" in the language processing application called "Voice IF", and this language processing server called "Voice Recog" has acquired a value "60" as a numerical value indicating the power of the background noise.

According to this second embodiment, it is possible for the speech recognition server 604 to acquire the power of the background noise as the status data, and increase the sound volume of the speech synthesis when the background noise is large. Consequently, it is possible to prevent the hearing obstruction due to the large background noise, such that the speech dialogue system with an improved speech comprehensibility can be realized.

It is to be noted that, in a case of the speech dialogue system utilizing the telephone line, it is possible to modify this second embodiment to use the power of the speech input as the status data instead of the power of the background noise. In such a case, when the sound level of the speech input is large, the sound level of the speech synthesis at the speech synthesis server 605 can be lowered in counter proportion to the power of the speech input. In general, in the speech recognition, when the speech is uttered loudly, the phonemic characteristic is changed and the recognition rate tends to be lowered. However, by lowering the power of the speech synthesis in counter proportion to the power of the speech input, it is possible to expect a psychological effect on a speech speaker to control the loudness of the speech utterance, and this effect in turn can contribute to the improvement of the recognition rate in the speech recognition.

It is also possible to modify this second embodiment to use words outputted by the speech synthesis server 605 as the status data instead of the power of the background noise. In such a case, the speech recognition server 604 can adjust its speech recognition operation by giving a higher priority level to the words indicated by the status data as recognition targets. In this manner, it is possible to expect an improvement of the speech recognition rate in the speech dialogue system, because it is fairly common practice for a human speaker to repeat the words uttered by an opponent even in a human conversation.

Referring now to FIG. 14 to FIG. 18, the third embodiment of the language processing application system according to the present invention in a form of a speech dialogue type machine translation system will be described in detail.

Figure 14:
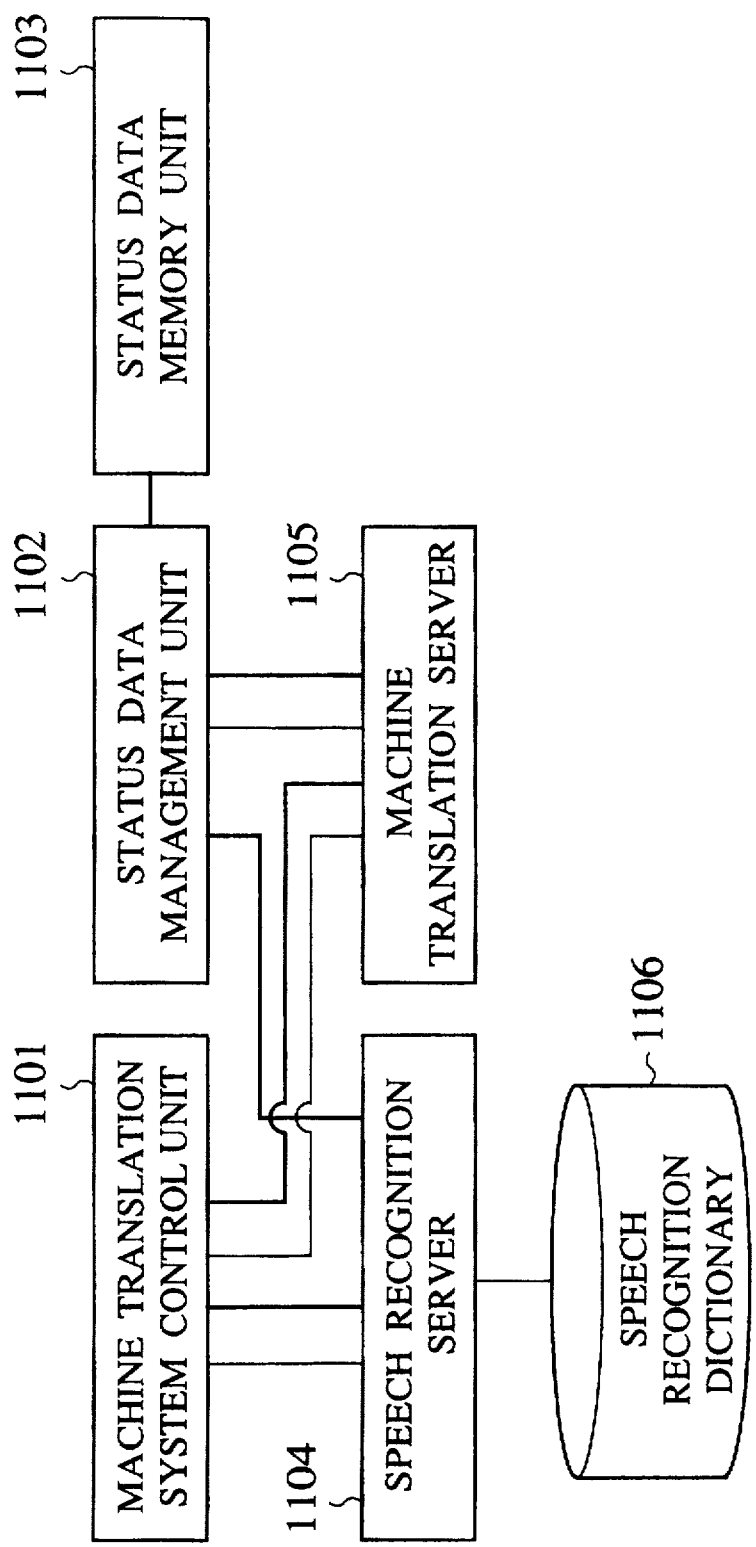
FIG. 14 is a block diagram of a functional configuration of the third embodiment of a language processing application system according to the present invention.

As shown in FIG. 14, the speech dialogue type machine translation system of this third embodiment comprises a speech recognition server 1104 and a machine translation server 1105 as the specific language processing servers, a machine translation system control unit 1101 for controlling this machine translation system as a whole, and a status data management unit 1102 and a status data memory unit 1103 similar to those of the first embodiment described above.

Here, the details of the processing related to the speech recognition function to be provided by the speech recognition server 1104 are not essential features of this third embodiment, and it is possible to utilize the known speech recognition function such as the speech word recognition scheme using vocabulary set as the recognition target candidates for example.

Similarly, the details of the processing related to the machine translation function to be provided by the machine translation server 1105 are not essential features of this third embodiment, and it is possible to utilize the known machine translation function such as that disclosed in Japanese Patent Application Laid Open No. 3-10984 (1991) for example.

Also, the functions of the machine translation system control unit 1101 related to the speech recognition and machine translation functions themselves are not essential features of this third embodiment, and it is possible to utilize the known control scheme, so that only the functions related to the acquisition and utilization of the status data characteristic to the present invention will be described for this machine translation system control unit 1101 in the following.

Figure 15:
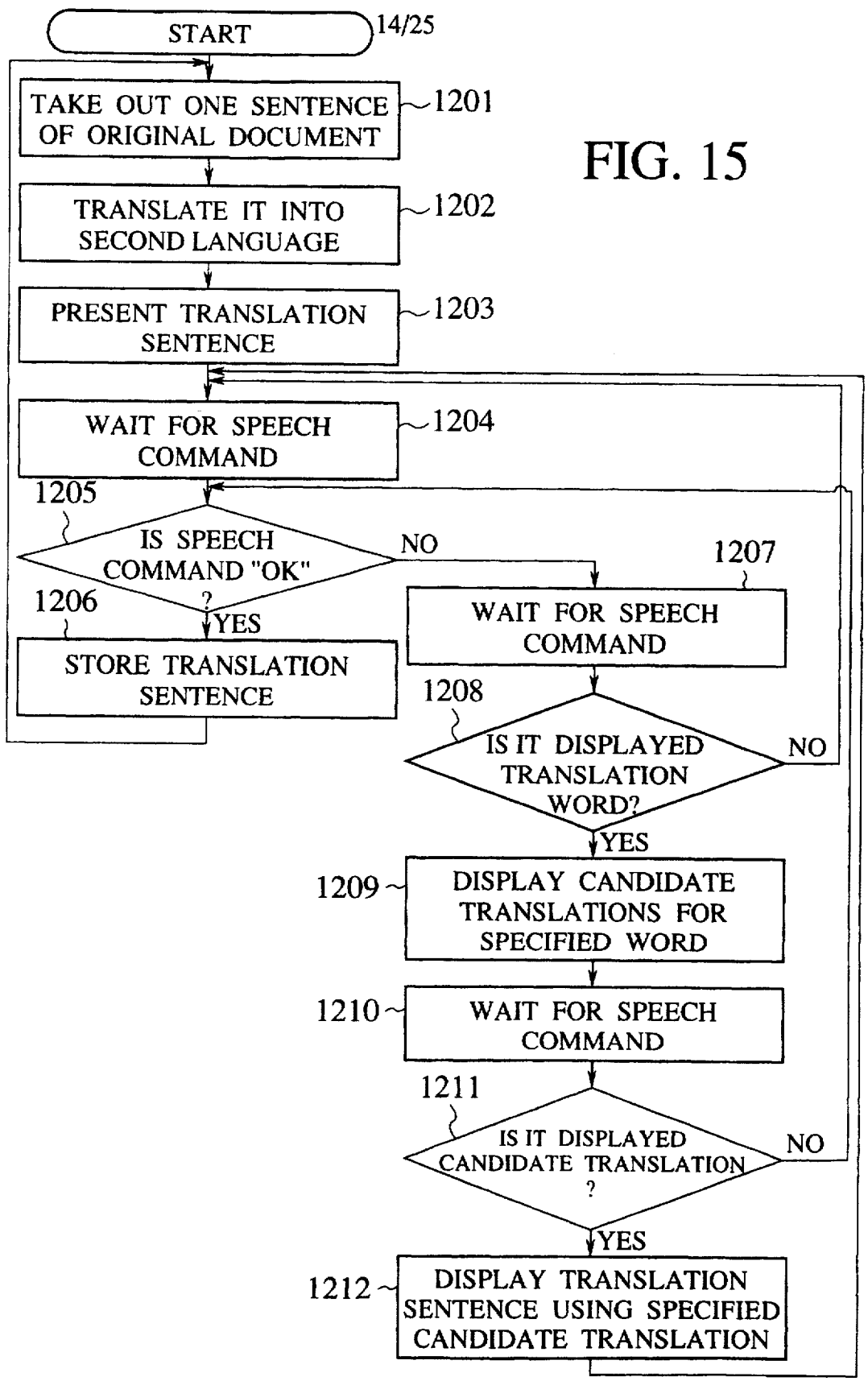
FIG. 15 is a flow chart for an operation of a control unit in the language processing application system of FIG. 14.

In this third embodiment, the machine translation system control unit 1101 operates according to the flow chart of FIG. 15 as follows.

Figure 16:
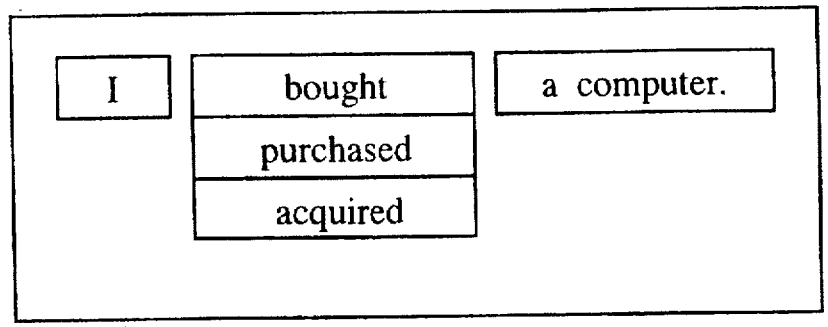
FIG. 16 is a diagrammatic illustration of an exemplary translation result obtained in the language processing application system of FIG. 14.

First, one sentence of the original document is taken out (1201), and transmitted to the machine translation server 1105 to obtain a translation of this sentence into the second language (1202). Here, in general, the obtained translations for some words as illustrated in FIG. 16, and this translation sentence is presented (1203) by displaying the first candidate translation for each word initially. Next, the control unit 1101 requests the speech recognition server 1104 to recognize the speech input, and awaits for an input of a speech command from the user (1204). When the speech command is entered, whether the entered speech command is "OK" or not is checked (1205), and if so (1205 YES), it implies that the user is satisfied with the displayed translation sentence, so that this translation sentence is stored (1206) and the operation returns to the step 1201 for the next sentence in the original document.

On the other hand, when the entered speech command is not "OK" (1205 NO), a next speech command is awaited (1207). When the next speech command is one of the displayed translation words (1208 YES), candidate translations for that word specified by this speech command is displayed (1209), and a next speech command is awaited (1210). Then, when the next speech command is one of the displayed candidate translations (1211 YES), the translation sentence is rewritten by using that candidate translation specified by this speech command in place of the specified translation word and displayed (1212), and the operation returns to the step 1204. When the speech command is not one of the displayed translation words (1208 NO), the operation also returns to the step 1204, whereas when the speech command is not one of the displayed candidate translations (1211 NO), the operation returns to the step 1205.

As an illustrative example, when the translation result as shown in FIG. 16 is received from the machine translation server 1105, the initially displayed translation sentence is going to be "I bought a computer.". Then, when the user wishes to change the translation word "bought" into "purchased", the operation proceeds as follows.

In this case, the display at the step 1203 is going to be "I bought a computer.". Then, when the user enters the speech command "correction" at this point, it is judged that this speech command is not "OK" at the step 1205, so that the operation enters into the translation word selection mode of the steps 1207 to 1212. Next, when the user enters the next speech command "bought" at this point, it is judged that this speech command is one of the displayed translations words at the step 1208, so that the display at the step 1209 is going to be three candidate translations of "bought", "purchased", and "acquired". Next, when the user enters the next speech command "purchased" at this point, it is judged that this speech command is one of the displayed candidate translations at the step 1211, so that the display at the step 1212 is going to be "I purchased a computer." which is a desired translation sentence commanded by the user.

In the speech recognition processing of this third embodiment, a new translation word for replacing an old translation word is specified by the speech input, so that the speech recognition server 1104 is required to be able to recognize an appropriate word among a large scale vocabulary. However, in general, the speech recognition has a tendency to lower its recognition rate as the recognition target vocabulary becomes larger. However, in this third embodiment, it is possible to limit the recognition target vocabulary to a manageable size by means of the status data managed by the status data management unit 1102.

In relation to the acquisition and utilization of the status data, the machine translation server 1105 operates according to the flow chart of FIG. 17, while the speech recognition server 1104 operates according to the flow chart of FIG. 18, as follows.

Figure 17:
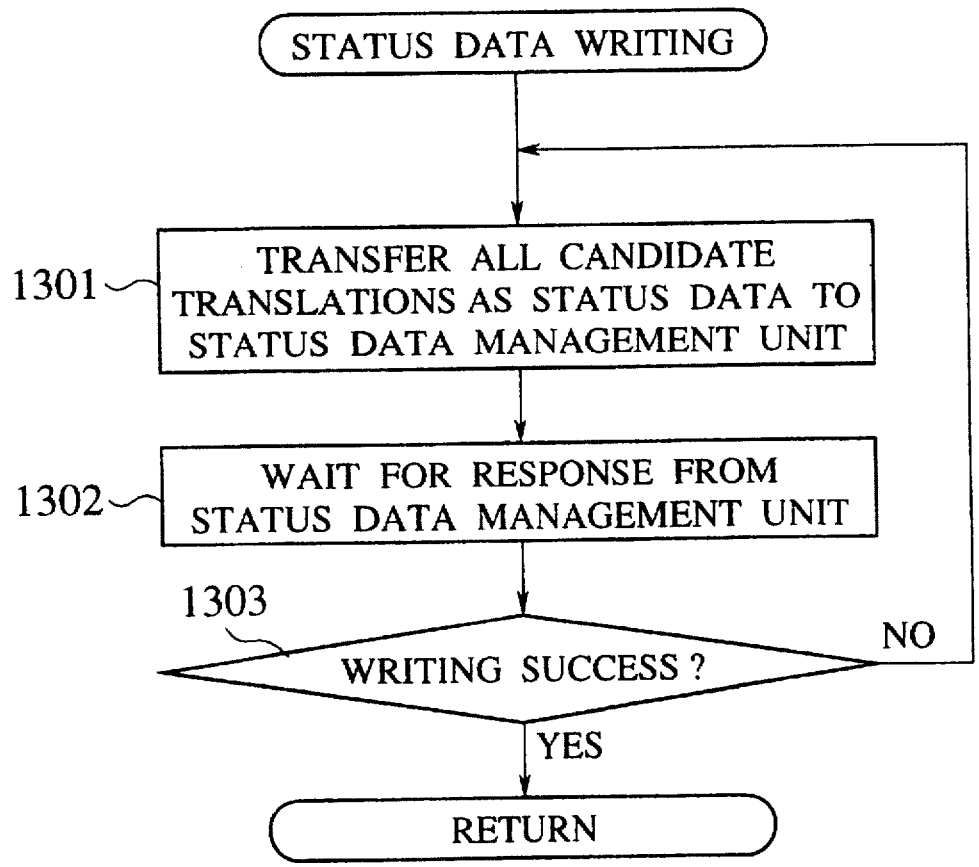
FIG. 17 is a flow chart for an operation of a machine translation server in the language processing application system of FIG. 14 at a time of status data writing.

At the machine translation server 1105, the operation of FIG. 17 is activated when the translation sentence is obtained. First, all the candidate translations in the translation sentence are transferred to the status data management unit 1102 as the status data (1301). Then, a response from the status data management unit 1102 is awaited (1302), and the operation is terminated when the writing success is notified from the status data management unit 1102 in response (1303 YES), whereas otherwise (1303 NO), the operation returns to the step 1301.

Figure 18:
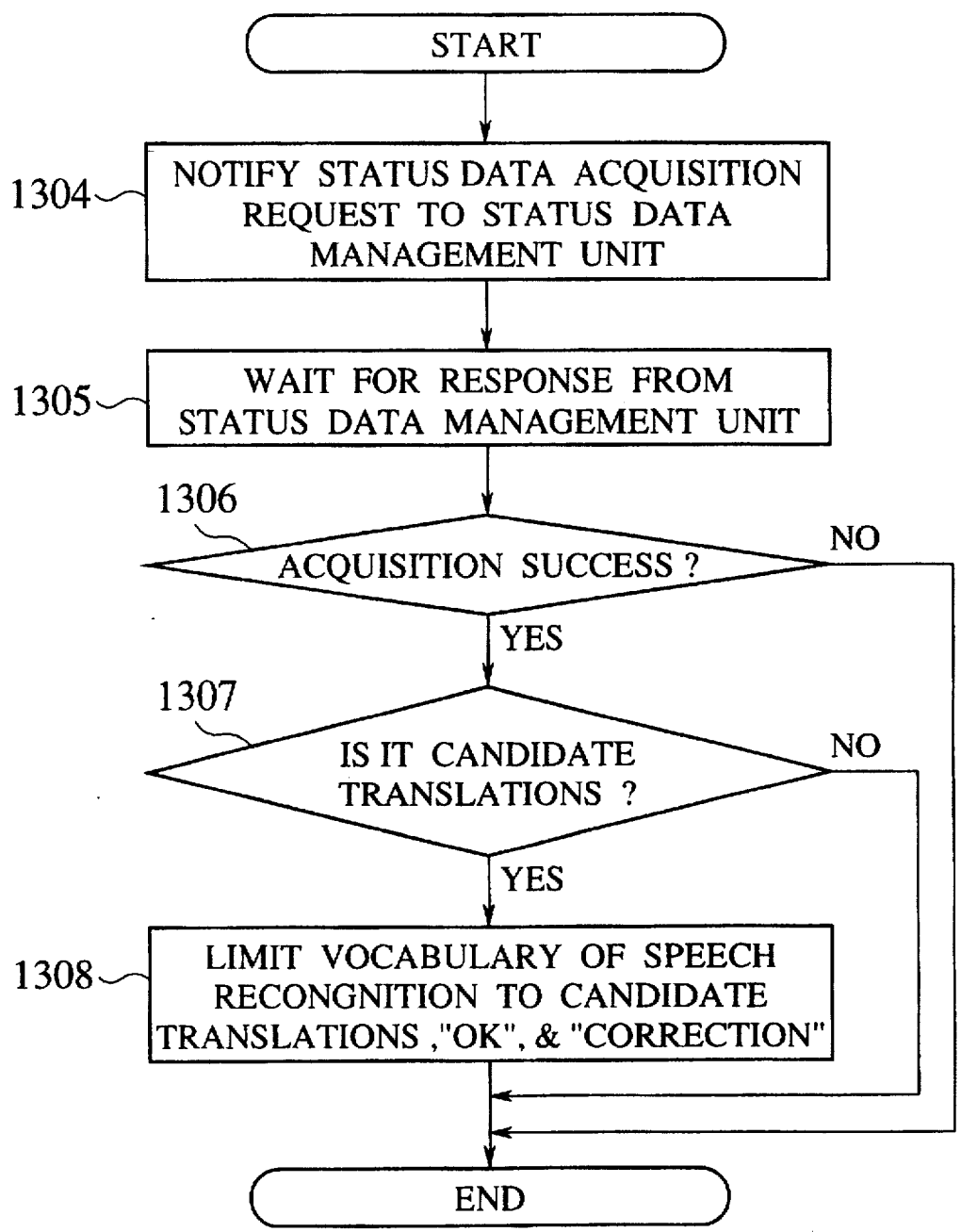
FIG. 18 is a flow chart for an operation of a speech recognition server in the language processing application system of FIG. 14 at a time of receiving status data arrival notice.

At the speech recognition server 1104, when the status data arrival notice is received from the status data management unit 1102, the operation of FIG. 18 is carried out as an interruption processing as follows. Namely, the speech recognition server 1104 notifies the status data acquisition request to the status data management unit 1102 (1304), and awaits for a response from the status data management unit 1102 (1305). Then, in a case of the status data acquisition success (1306 YES), whether the requested status data transferred from the status data management unit 1102 indicates the candidate translations or not is judged by checking a field of language processing phase provided in the status data (1307). When the received status data indicates the candidate translations (1307 YES), the vocabulary for the recognition target in the speech recognition is limited only to the candidate translations indicated by the received status data, "OK", and "correction" (1308) and the operation is terminated, whereas when the status data acquisition is unsuccessful (1306 NO) or when the received status data does not indicate the candidate translations (1307 NO), the operation is terminated immediately.

According to this third embodiment, the vocabulary for the recognition target in the speech recognition is limited to a smaller scale vocabulary set containing the candidate translations and a few other speech commands, so that the high precision speech recognition can be realized. Moreover, this vocabulary for the recognition target in the speech recognition is sequentially changed in adaptation to the change of the translation sentence in the translation processing, so that the user can make the speech input freely by virtually using a very large scale vocabulary set, without sensing any constraint such as the limitation of the words that can be used.

It is possible to modify this third embodiment to use a user input through a keyboard instead of the speech command input. In a case of an English-Japanese machine translation, the translation sentence is going to be displayed in Japanese, and in order to correct the displayed translation sentence in Japanese, the user is going to make an input by utilizing the kana-kanji conversion function, so that the system in such a case has the kana-kanji conversion server along with the machine translation server. In such a case, the improvement of the kana-kanji conversion precision can be achieved by limiting the conversion candidates in the kana-kanji conversion processing, in a manner similar to that for limiting the vocabulary in the third embodiment described above.

Referring now to FIG. 19 to FIG. 23, the fourth embodiment of the language processing application system according to the present invention in a form of a full text retrieval system with document reader function will be described in detail.

Figure 19:
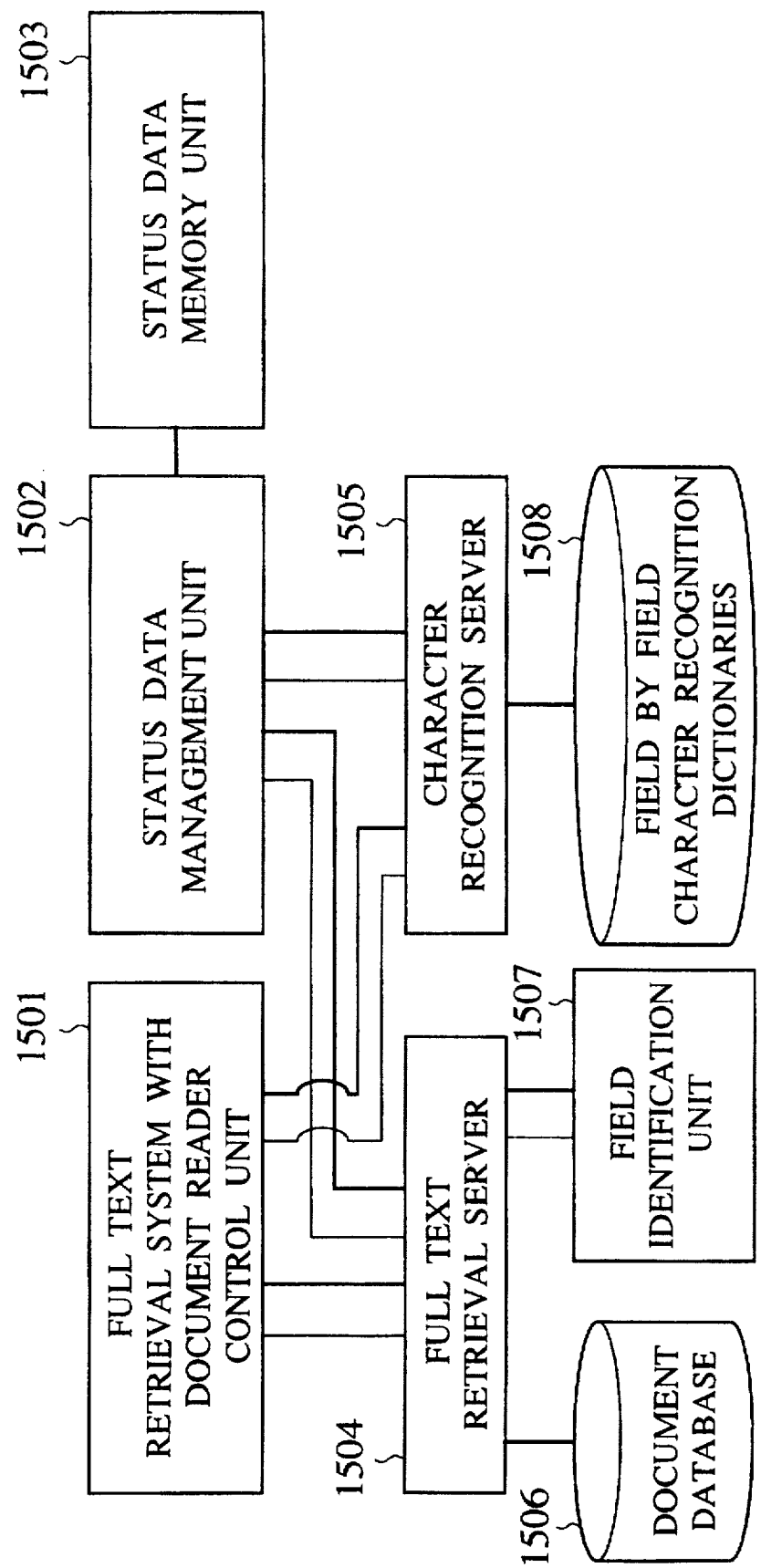
FIG. 19 is a block diagram of a functional configuration of the fourth embodiment of a language processing application system according to the present invention.

As shown in FIG. 19, the full text retrieval system of this fourth embodiment comprises a full text retrieval server 1504 and a character recognition server 1505 as the specific language processing servers, a full text retrieval system with document reader control unit 1501 for controlling this full text retrieval system as a whole, a status data management unit 1502 and a status data memory unit 1503 similar to those of the first embodiment described above, a document database 1506 connected with the full text retrieval server 1504 for storing documents to be retrieved, a field identification unit 1507 connected with the full text retrieval server 1504 for identifying a field (subject field) of the documents stored in the document database 1506, and field by field character recognition dictionaries 1508 connected with the character recognition server 1505.

In this fourth embodiment, the status data indicates a field (subject field) information obtained by analyzing the documents in the document database 1506, and this field information is utilized for improving the character recognition precision.

Here, the details of the processing related to the character recognition function to be provided by the character recognition server 1505 are not essential features of this third embodiment, and it is possible to utilize the known character recognition function such as that of the commercially available document reader for example. In general, in the character recognition processing, a recognition dictionary for character recognition is provided to store standard character pattern data. At a time of the character recognition, a character pattern data of the entered character and a character pattern data of each standard character stored in the recognition dictionary are matched, and the standard character to which the entered character resembles most according to the character pattern data matching is obtained as the recognition result. In this fourth embodiment, such a recognition dictionary is provided for each field (subject field) separately in the field by field character recognition dictionaries 1508.

In this fourth embodiment, the full text retrieval system with document reader control unit 1501 operates according to the flow chart of FIG. 20, as follows.

Namely, when this control unit 1501 is activated, an input of a command from the user is awaited first (1601). Then, when the command is entered by the user, whether the entered command is a retrieval execution command or not is checked (1602), and if so (1602 YES), a retrieval condition input from the user is awaited next (1603). Then, when the retrieval condition is entered by the user, the full text retrieval server 1504 is activated to retrieve a document matching with the entered retrieval condition from the document database 1506 (1604). Then, the obtained retrieval result is presented to the user (1605), and the operation returns to the step 1601.

On the other hand, when the command entered by the user after the step 1601 is not a retrieval execution command (1602 NO), whether the entered command is a document read command or not is checked (1606), and if so (1606 YES), the character recognition server 1505 is activated to read the document (1607). Then, the full text retrieval server 1504 is activated next to store the document read out by the character recognition server 1505 into the document database 1506 (1608), and the operation returns to the step 1601.

Also, when the command entered by the user after the step 1601 is neither a retrieval execution command (1602 NO) nor a document read command (1606 NO), whether the entered command is a finish command or not is checked (1609), and if so (1609 YES), the operation is terminated, whereas otherwise (1609 NO), the operation returns to the step 1601.

Figure 21:
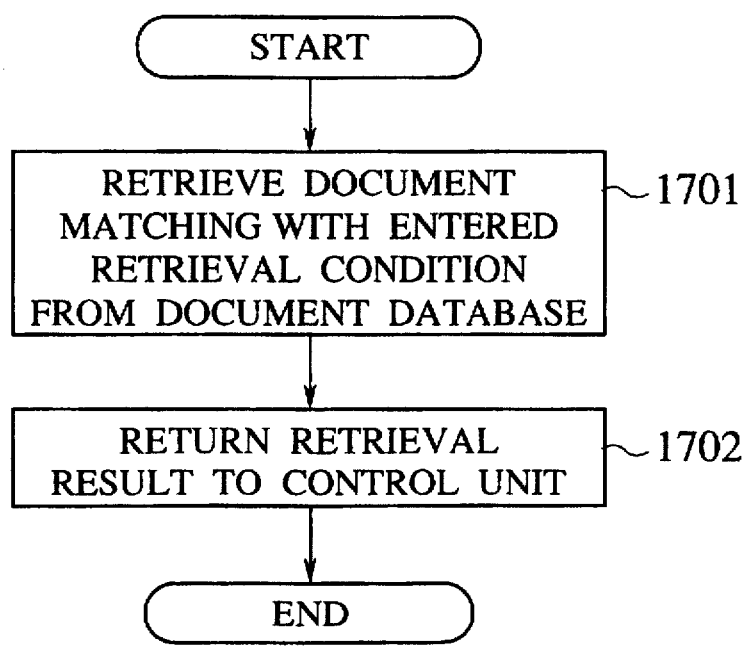
FIG. 21 is a flow chart for an operation of a full text retrieval server in the language processing application system of FIG. 19 at a time of document retrieval.
Figure 22:
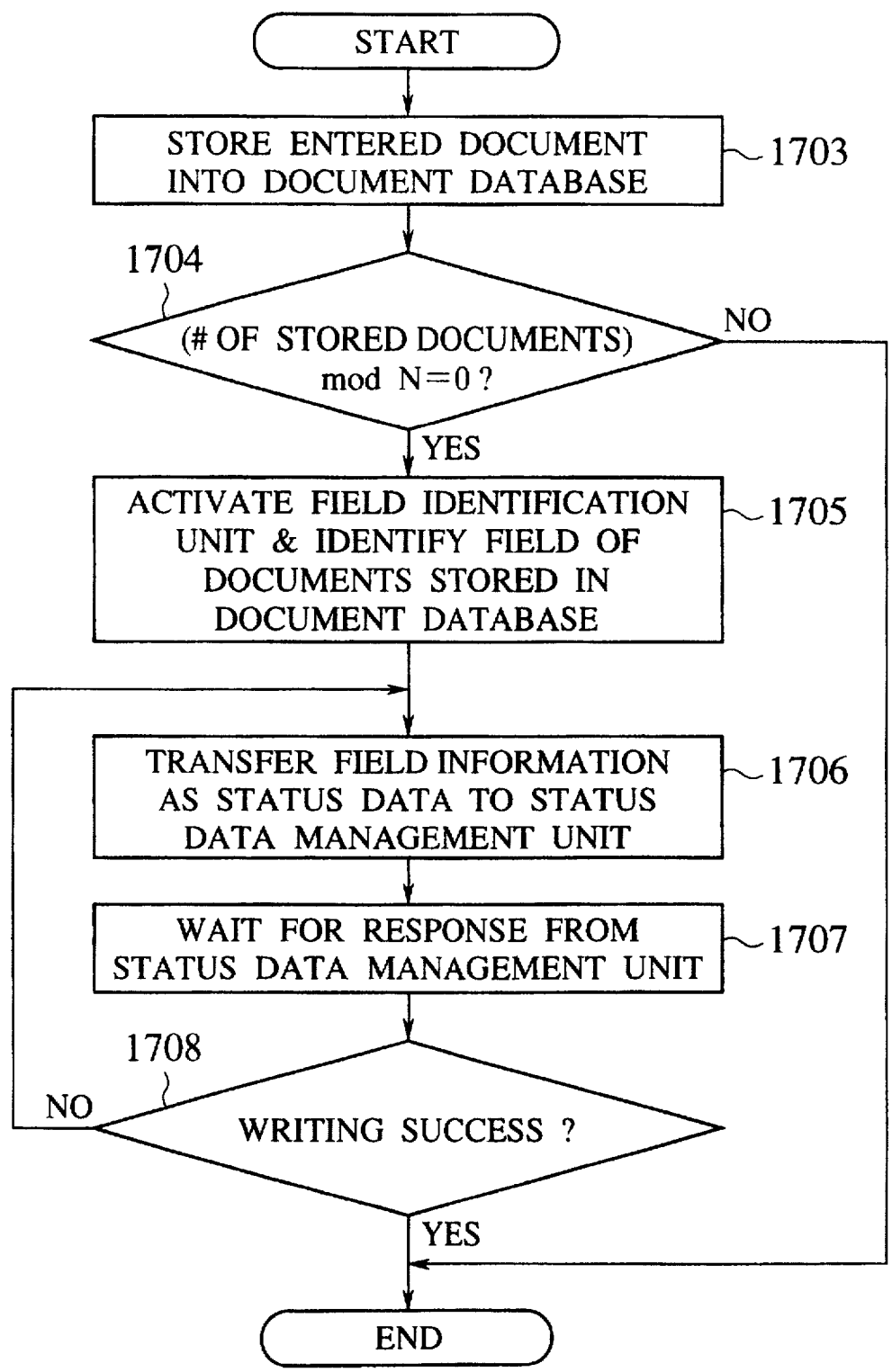
FIG. 22 is a flow chart for an operation of a full text retrieval server in the language processing application system of FIG. 19 at a time of document storing.

The full text retrieval server 1504 operates according to the flow charts of FIG. 21 and FIG. 22 as follows.

Figure 20:
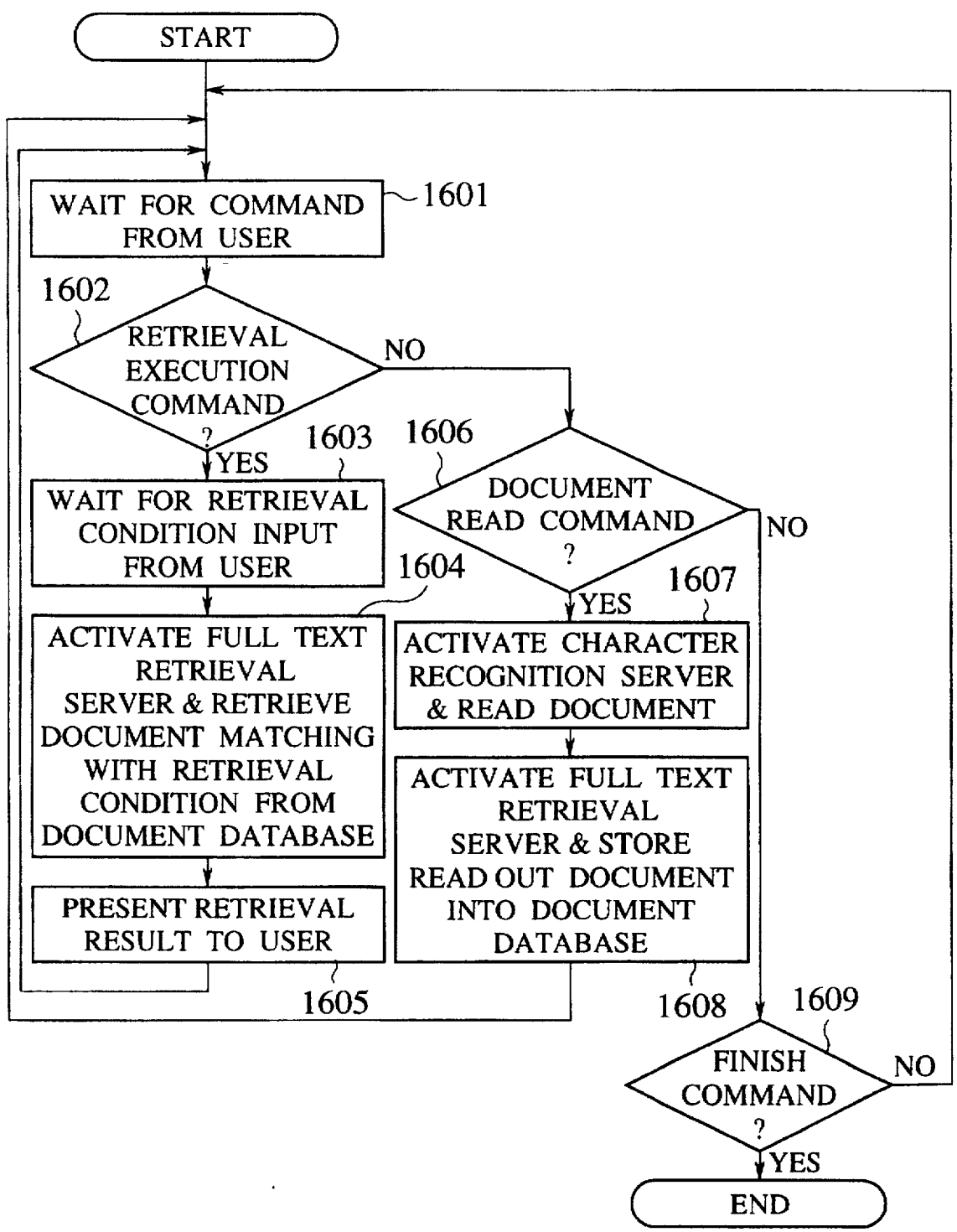
FIG. 20 is a flow chart for an operation of a control unit in the language processing application system of FIG. 19.

Namely, at a time of the document retrieval, the full text retrieval server 1504 is activated at the step 1604 in FIG. 20 to execute the document retrieval. In this case, according to FIG. 21, a document matching with the entered retrieval condition is retrieved from the document database 1506 (1701), and then the obtained retrieval result is returned to the control unit 1501 (1702). Here, the details of the processing related to the full text retrieval at the step 1701 can be realized by utilizing the known full text retrieval processing.

On the other hand, at a time of the document storing, the full text retrieval server 1504 is activated at the step 1608 in FIG. 20 to execute the document storing. In this case, according to FIG. 22, the entered document is stored into the document database 1506 first (1703), and whether a total number of stored documents in the document database 1506 divided by a prescribed constant number N is equal to 0 or not is checked (1704), and if not (1704 NO), the operation is terminated immediately.

Otherwise, next, the field identification unit 1507 is activated to identify the field (subject field) of the the documents stored in the document database 1506 (1705). Then, the field information obtained at the step 1705 is transferred to the status data management unit 1502 as the status data (1706), and a response from the status data management unit 1502 is awaited (1707). Then, the operation is terminated when the writing success is notified from the status data management unit 1502 in response (1708 YES), whereas otherwise (1708 NO), the operation returns to the step 1706.

Here, the field identification of the documents stored in the document database 1506 by the field identification unit 1507 can be realized by utilizing the known field (subject field) identification scheme. For example, the field for each document stored in the document database 1506 is determined first, and then the field obtained for the majority of the documents is determined as the field of the document database 1506.

Alternatively, a score Pij for each field j of each document i is calculated, and a weighted average of the scores for all the documents is calculated by using the weight wi for each document i determined according to a time elapsed since the storing of each document into the document database 1506, according to the following formula:

$$\sum_i wi * Pij$$

where the weights wi are normalized such that $$\sum_i \sum_j wi * Pij = 1$$

In relation to the acquisition of the status data, the character recognition server 1505 operates according to the flow chart of FIG. 23, as follows.

Figure 23:
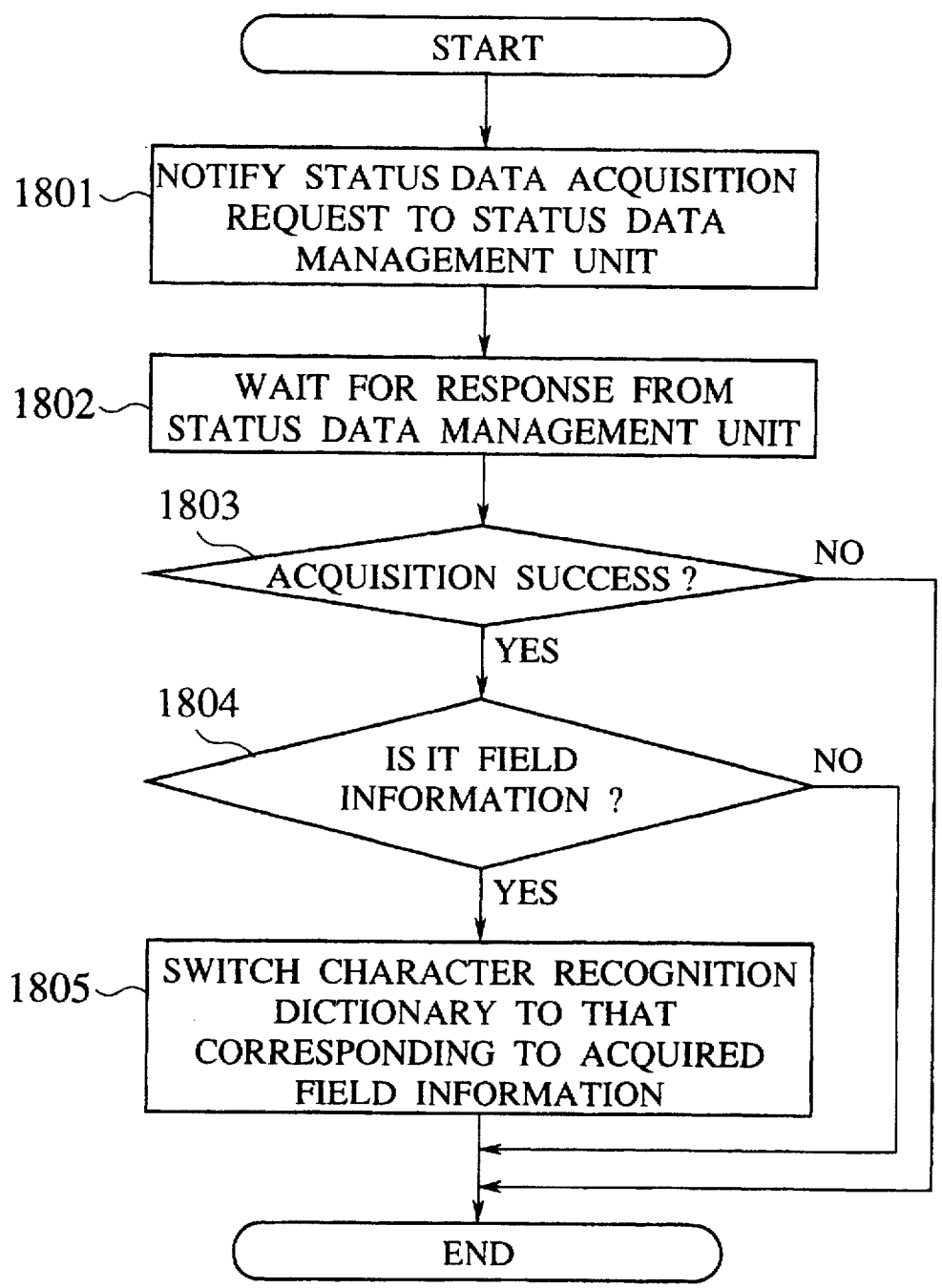
FIG. 23 is a flow chart for an operation of a character recognition server in the language processing application system of FIG. 19 at a time of receiving status data arrival notice.

Namely, when the status data arrival notice is received from the status data management unit 1502, the operation of FIG. 23 is carried out. First, the character recognition server 1505 notifies the status data acquisition request to the status data management unit 1502 (1801), and awaits for a response from the status data management unit 1502 (1802). Then, in a case of the status data acquisition success (1803 YES), whether the requested status data transferred from the status data management unit 1502 indicates the field information or not is judged by checking a field of language processing phase provided in the status data (1804). When the received status data indicates the field information (1804 YES), the character recognition dictionary is switched in correspondence to the acquired field information (1805) and the operation is terminated, whereas when the status data acquisition is unsuccessful (1803 NO) or when the received status data does not indicate the field information (1804 NO), the operation is terminated immediately.

In general, in the character recognition, the recognition error can be reduced as much as a set of characters to be recognized is limited. In this fourth embodiment, the character recognition dictionary is switched to that for each field according to the field information indicated by the status data, so that a set of characters to be recognized can be reduced, and consequently the improvement of the character recognition performance can be realized.

Figure 24:
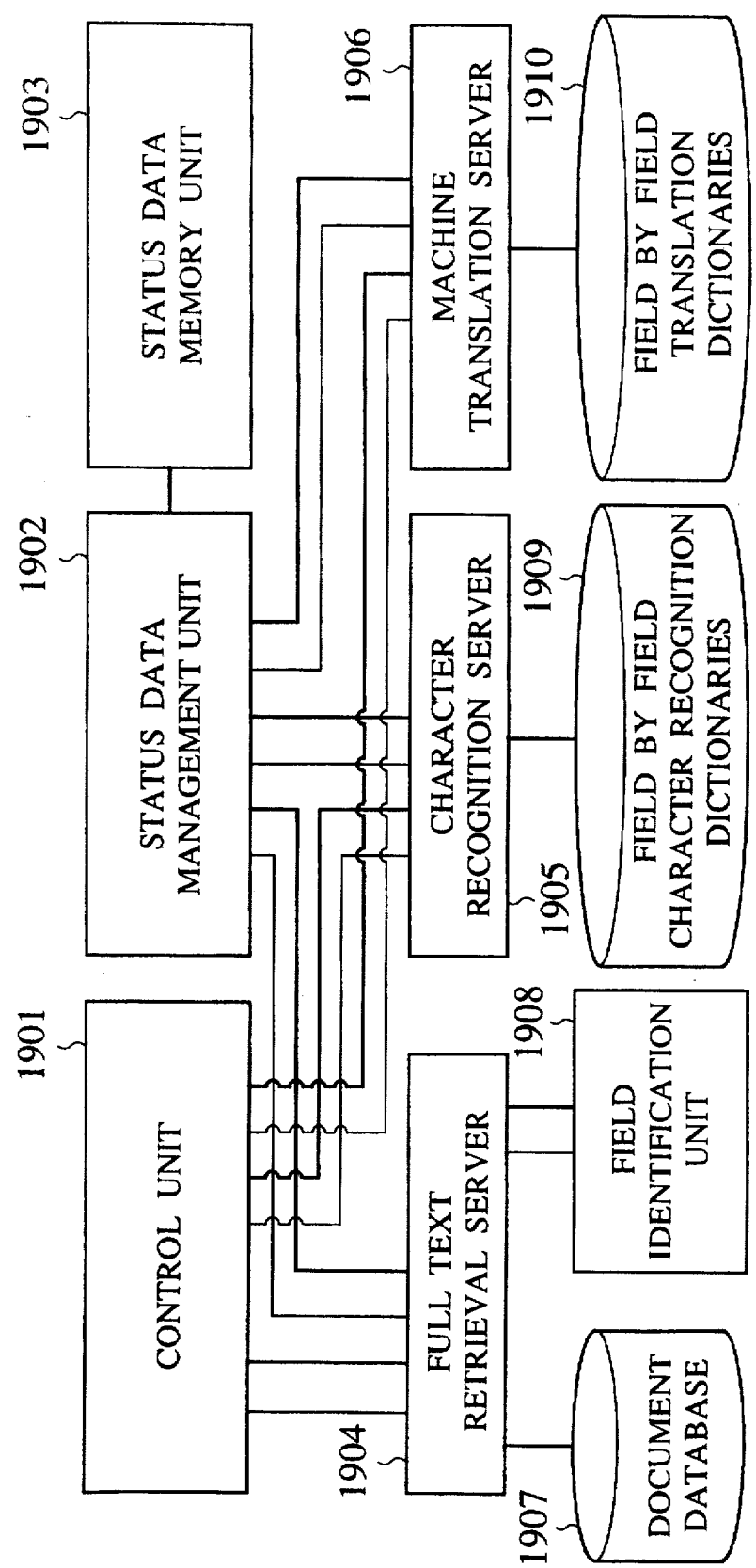
FIG. 24 is a block diagram of a functional configuration of the fifth embodiment of a language processing application system according to the present invention.
Figure 25:
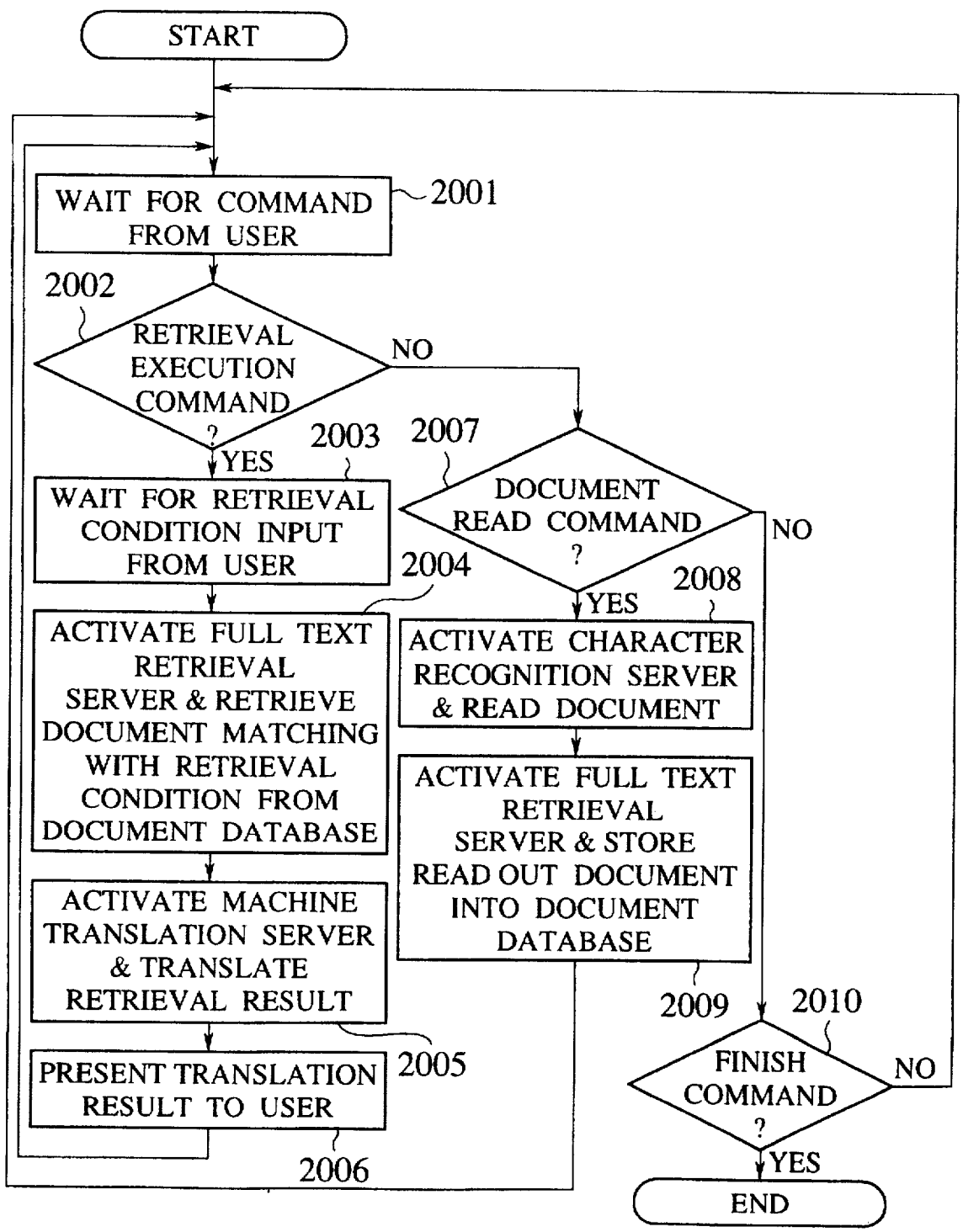
FIG. 25 is a flow chart for an operation of a control unit in the language processing application system of FIG. 24.
Figure 26:
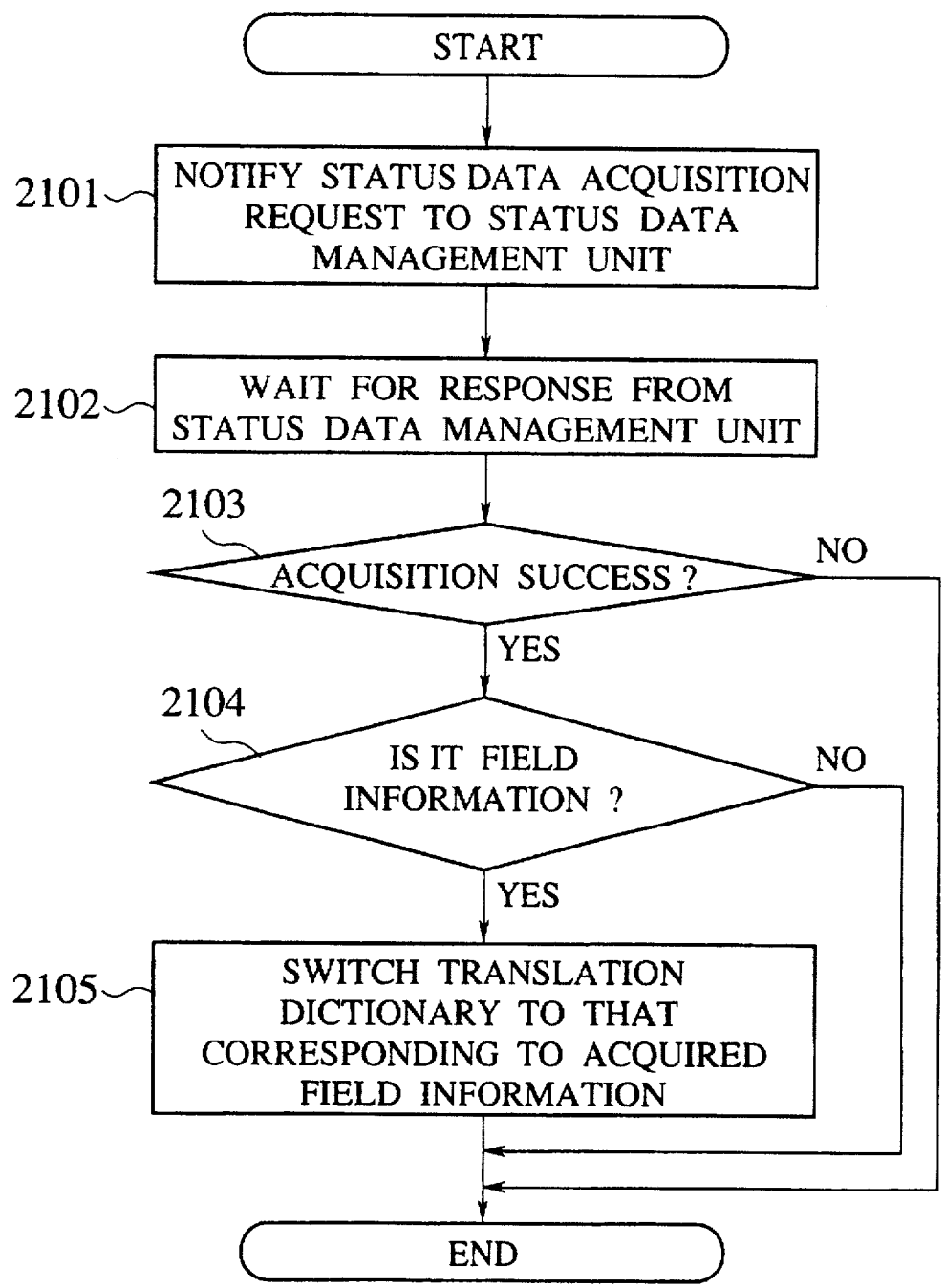
FIG. 26 is a flow chart for an operation of a machine translation server in the language processing application system of FIG. 24 at a time of receiving status data arrival notice.

Referring now to FIG. 24 to FIG. 26, the fifth embodiment of the language processing application system according to the present invention in a form of a full text foreign language document retrieval system with document reader function will be described in detail.

As shown in FIG. 24, the full text foreign language document retrieval system of this fifth embodiment comprises a full text retrieval server 1904, a character recognition server 1905, and a machine translation server 1906 as the specific language processing servers, a control unit 1901 for controlling this full text foreign language document retrieval system as a whole, a status data management unit 1902 and a status data memory unit 1903 similar to those of the first embodiment described above, a document database 1907 connected with the full text retrieval server 1904 for storing foreign language documents to be retrieved, a field identification unit 1908 connected with the full text retrieval server 1904 for identifying a field (subject field) of the foreign language documents stored in the document database 1907, field by field character recognition dictionaries 1909 connected with the character recognition server 1905, and field by field translation dictionaries 1910 connected with the machine translation server 1906.

In this fifth embodiment, the status data indicates a field (subject field) information obtained by analyzing the foreign language documents in the document database 1907, and this field information is utilized for improving the character recognition precision and the machine translation precision.

In this fifth embodiment, the control unit 1901 operates according to the flow chart of FIG. 25, as follows.

Namely, when this control unit 1901 is activated, an input of a command from the user is awaited first (2001). Then, when the command is entered by the user, whether the entered command is a retrieval execution command or not is checked (2002), and if so (2002 YES), a retrieval condition input from the user is awaited next (2003). Then, when the retrieval condition is entered by the user, the full text retrieval server 1904 is activated to retrieve a document matching with the entered retrieval condition from the document database 1907 (2004), and the machine translation server 1906 is activated to translate the retrieval result (2005). Then, the obtained translation result is presented to the user (2006), and the operation returns to the step 2001.

On the other hand, when the command entered by the user after the step 2001 is not a retrieval execution command (2002 NO), whether the entered command is a document read command or not is checked (2007), and if so (2007 YES), the character recognition server 1905 is activated to read the document (2008). Then, the full text retrieval server 1904 is activated next to store the document read out by the character recognition server 1905 into the document database 1907 (2009), and the operation returns to the step 2001.

Also, when the command entered by the user after the step 2001 is neither a retrieval execution command (2002 NO) nor a document read command (2007 NO), whether the entered command is a finish command or not is checked (2010), and if so (2010 YES), the operation is terminated, whereas otherwise (2010 NO), the operation returns to the step 2001.

The full text retrieval server 1904 and the character recognition server 1905 operate substantially similarly as in the fourth embodiment described above.

Also, the details of the processing related to the machine translation function to be provided by the machine translation server 1906 are not essential features of this fifth embodiment, and it is possible to utilize the known machine translation function such as that disclosed in Japanese Patent Application Laid Open No. 3-10984 (1991) for example.

In relation to the acquisition of the status data, the machine translation server 1906 operates according to the flow chart of FIG. 26, as follows.

Namely, when the status data arrival notice is received from the status data management unit 1902, the operation of FIG. 26 is carried out. First, the machine translation server 1906 notifies the status data acquisition request to the status data management unit 1902 (2101), and awaits for a response from the status data management unit 1902 (2102). Then, in a case of the status data acquisition success (2103 YES), whether the requested status data transferred from the status data management unit 1902 indicates the field information or not is judged by checking a field of language processing phase provided in the status data (2104). When the received status data indicates the field information (2104 YES), the translation dictionary is switched in correspondence to the acquired field information (2105) and the operation is terminated, whereas when the status data acquisition is unsuccessful (2103 NO) or when the received status data does not indicate the field information (2104 NO), the operation is terminated immediately.

In this fifth embodiment, the field information obtained by the full text retrieval server 1904 can be utilized in a plurality of other language processing servers such as the character recognition server 1905 and the machine translation server 1906 so as to improve the language processing performance at each of these other language processing servers.

Figure 27:
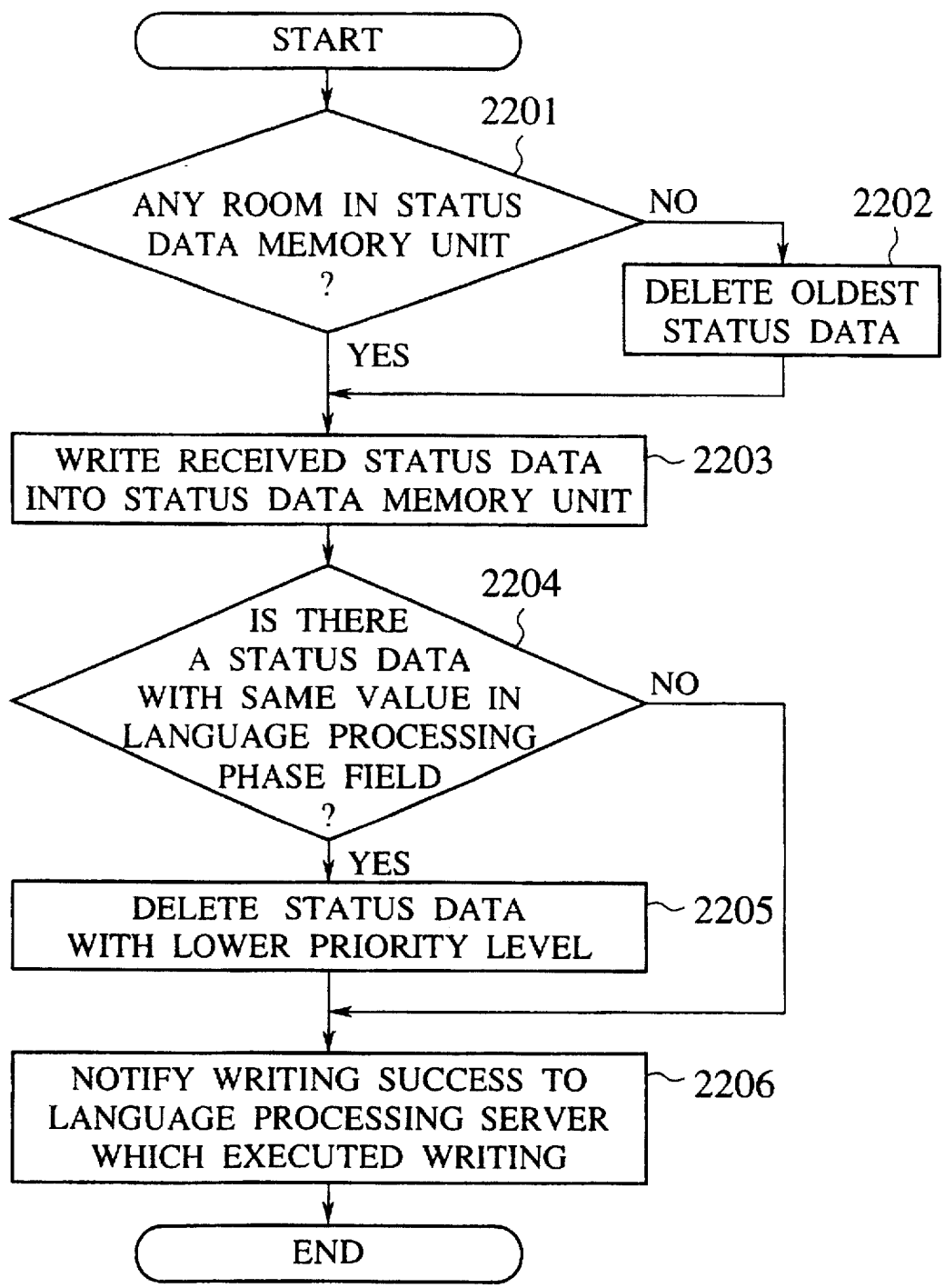
FIG. 27 is a flow chart for an operation of a status data management unit in the sixth embodiment of a language processing application system according to the present invention at a time of receiving status data.

Referring now to FIG. 27, the sixth embodiment of the language processing application system according to the present invention in a form of a full text foreign language document retrieval system with document reader function will be described in detail.

This sixth embodiment is a modification of the fifth embodiment described above, which uses the same configuration as shown in FIG. 24 described above. In this sixth embodiment, the status data management unit 1902 has an additional function to arbitrate the conflict among a plurality of status data. This function is activated when a plurality of language processing servers acquired similar types of status data, and these status data conflict with each other.

In this sixth embodiment, when the status data is received, the status data management unit 1902 operates according to the flow chart of FIG. 27, as follows.

Namely, when a new status data is received, the status data management unit 1902 checks whether there is any room in the status data memory unit 1903 or not (2201), and deletes the oldest status data when there is no room (2202). Then, the status data management unit 1902 writes this received new status data into the status data memory unit 1903 (2203).

At this point, the status data management unit 1902 checks whether there exists a status data in the status data memory unit 1903 which has the same value in a field of language processing phase (as well as in a field of user name and a field of language processing application name) as the received new status data or not (2204), and if so (2204 YES), the status data management unit 1902 deletes the status data with a lower priority level among these status data with the same value in a field of language processing phase (2205). Otherwise (2204 NO), this step 2205 is skipped.

Then, the status data management unit 1902 notifies the writing success to the language processing server which executed this status data writing 2206).

Here, in order to determine the priority level of the status data, the priority order among the language processing servers 1904 to 1906 is assigned in advance. For example, the following priority order may be assigned in advance.

server 1904>server 1905>server 1906 where an inequality indicates a relative level of the priority level assigned to each language processing server, such that the full text retrieval server 1904 has a highest priority level, the machine translation server 1906 has a lowest priority level, and the character recognition server 1905 has an intermediate priority level between the full text retrieval server 1904 and the machine translation server 1906.

In this manner, when the status data memory unit 1903 stores a plurality of mutually conflicting status data, the status data obtained by the language processing server with a lower priority level is deleted by the status data management unit 1902 to resolve the conflict.

It is also possible to modify this sixth embodiment such that a format for each block of the status data as shown in FIG. 3 is expanded to include an additional field for describing a certainty level, such that the priority level of the status data is determined according to the value of this certainty level at a time of determining the status data to be deleted. Here, the certainty level for the status data can be obtained by each language processing server at a time of obtaining the status data. For example, when the full text retrieval server 1904 obtains the field (subject field) of the documents stored in the document database 1907 by using the above described formula:

$$\sum_i wi * Pij$$

the full text retrieval server 1904 obtains the field (subject field) which maximize a value given by the above formula.

This value given by the above formula tends to be smaller when the stored documents have more widely distributed subject fields, so that this value given by the above formula can be utilized as the certainty level in this case.

It is to be noted here that the present invention is equally applicable to various language processing servers other than those used in the embodiments described above, such as a proof-reading server for proof-reading the document, an on-line character recognition server for recognizing handwritten characters entered by on-line mode, etc.

It is also to be noted here that, in the various embodiments described above, the processing result obtained by each language processing server can be displayed on a display unit.(not shown) connected to the control unit in each embodiment, even though its description has been omitted in the above description.

It is also to be noted here that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A language processing application system, comprising:

a plurality of language processing servers capable of providing mutually different language processing functions; and status data management means capable of managing status data obtained from a language processing server of said plurality of language processing servers in the course of language processing, the status data indicating at least one of features of input data processed by said language processing server in the course of language processing and being accompanied by information indicating a phase of language processing by the language processing server which provided the status data;

each of said plurality of language processing servers being capable of receiving status data obtained from said language processing server by the status data management means, and each being further capable of adjusting its language processing according to said status data, the status data management means being capable of broadcasting status data to each of said plurality of language processing servers, and each language processing server being further capable of determining whether to adjust its language processing according to status data broadcast by the status data management means based on a phase of language processing of a language processing server indicated by the status data.

2. The system of claim 1, wherein said plurality of language processing servers includes a speech recognition server and a speech synthesis server, the speech synthesis server being capable of adjusting a sound level of speech to be synthesized in the course of speech synthesis processing according to information regarding a level of a background noise which is obtained by the speech recognition server in the course of a speech recognition processing and which is received by the speech synthesis server as status data from the status data management means.

3. The system of claim 1, wherein said plurality of language processing servers includes a speech recognition server and a speech synthesis server, the speech synthesis server being capable of lowering a sound level of speech to be synthesized in the course of speech synthesis processing according to information indicating a higher level of a speech input which is obtained by the speech recognition server in the course of a speech recognition processing and which is received by the speech synthesis server as status data from the status data management means.

4. The system of claim 1, wherein said plurality of language processing servers includes a speech recognition server and a speech synthesis server, the speech recognition server being capable of giving a higher priority as a recognition target word to each word which is synthesized in the course of speech synthesis processing by the speech synthesis server and which is received by the speech recognition server as status data from the status data management means.

5. The system of claim 1, wherein said plurality of language processing servers includes a speech recognition server and a machine translation server, the speech recognition server being capable of limiting a vocabulary to be recognized in a course of speech recognition processing according to information regarding translation words which is obtained by the machine translation server in the course of machine translation processing and which is received by the speech recognition server as status data from the status data management means.

6. The system of claim 1, wherein said plurality of language processing servers includes a kana-kanji conversion server and a machine translation server, the kana-kanji conversion server being capable of limiting candidate conversion results in the course of kana-kanji conversion processing according to information regarding translation words which is obtained by the machine translation server in the course of machine translation processing and which is received by the kana-kanji conversion server as status data from the status data management means.

7. The system of claim 1, wherein said plurality of language processing servers includes a full text retrieval server and a character recognition server, the character recognition server being capable of switching a recognition dictionary to be used in the course of character recognition processing according to information regarding a subject field of documents stored in a document database for use in a course of full text retrieval processing by the full text retrieval server which is received by the character recognition server as status data from the status data management means.

8. The system of claim 1, wherein said plurality of language processing servers includes a full text retrieval server, a machine translation server, and a character recognition server, the machine translation server being capable of switching a translation dictionary to be used in the course of a machine translation processing and the character recognition server being capable of switching a recognition dictionary to be used in the course of character recognition processing according to information regarding a subject field of documents stored in a document database for use in the course of full text retrieval processing by the full text retrieval server which is received by the machine translation server and the character recognition server as status data from the status data management.

9. The system of claim 1, wherein the status data management means is capable of arbitrating conflict among conflicting status data provided by said plurality of language processing servers.

10. The system of claim 9, wherein the status data management means is capable of arbitrating the conflict by deleting status data having a low priority level among said conflicting status data.

11. The system of claim 10, wherein the status data management means is capable of determining a priority level of each conflicting status data according to a predetermined priority order.

12. The system of claim 10, wherein the status data management means is capable of determining a priority level of each conflicting status data according to a certainty level of each conflicting status data determined in the course of language processing by a language processing server.

13. The system of claim 1, wherein the status data indicating at least one of features of input data processed by a language processing server indicates said at least one feature numerically or symbolically.

14. A language processing application method, comprising:

providing, in each of a plurality of language processing servers, one of mutually different language processing functions;

managing, in a status data managing means, status data obtained in the course of language processing by a first of said plurality of language processing servers, the status data indicating at least one of features of input data processed by said first language processing server and being accompanied by information indicating a phase of language processing of said first language processing server;

acquiring, in a second of said plurality of language processing servers, status data obtained by said status data managing means from said first language processing server;

adjusting language processing in said second language processing server according to said status data obtained by said status data management means;

broadcasting status data received from said first language processing server to each of said plurality of language processing servers; and determining in each language processing server whether to adjust language processing according to the status data broadcast by the status data management means, based on a phase of language processing of said first language processing server.

15. The method of claim 14, wherein said plurality of language processing servers includes a speech recognition server and a speech synthesis server, and the speech synthesis server adjusts a sound level of speech to be synthesized in the course of speech synthesis processing according to information regarding a level of background noise which is obtained in the course of speech recognition processing by the speech recognition server and which is acquired as status data from the status data management means.

16. The method of claim 14, wherein said plurality of language processing servers includes a speech recognition server and a speech synthesis server, and the speech synthesis server lowers a sound level of speech to be synthesized in the course of speech synthesis processing according to information indicating a higher level of speech input which is obtained in the course of speech recognition processing by the speech recognition server and which is acquired as status data from the status data management means.

17. The method of claim 14, wherein said plurality of language processing servers includes a speech recognition server and a speech synthesis server, and the speech recognition server gives a higher priority as a recognition target word to each word which is synthesized in the course of speech synthesis processing by the speech synthesis server and which is acquired as status data from the status data management means.

18. The method of claim 14, wherein said plurality of language processing servers includes a speech recognition server and a machine translation server, and the speech recognition server limits a vocabulary to be recognized in the course of speech recognition processing according to information regarding translation words which is obtained in the course of machine translation processing by the machine translation server and which is acquired as status data from the status data management means.

19. The method of claim 14, wherein said plurality of language processing servers includes a kana-kanji conversion server and a machine translation server, and the kana-kanji conversion server limits candidate conversion results in the course of kana-kanji conversion processing according to information regarding translation words which is obtained in the course of machine translation processing by the machine translation server and which is acquired as status data from the status data management means.

20. The method of claim 14, wherein said plurality of language processing servers includes a full text retrieval server and a character recognition server, and the character recognition server switches a recognition dictionary to be used in the course of character recognition processing according to information regarding a subject field of documents which is stored in a document database for use in the course of full text retrieval processing by the full text retrieval server and which is acquired as status data from the status data management means.

21. The method of claim 14, wherein said plurality of language processing servers includes a full text retrieval server, a machine translation server, and a character recognition server, and the machine translation server switches a translation dictionary to be used in the course of machine translation processing while the character recognition server switches a recognition dictionary to be used in the course of character recognition processing according to information regarding a subject field of documents which is stored in a document database for use in the course of full text retrieval processing by the full text retrieval server and which is acquired from the status data management means as the status data.

22. The method of claim 14, further comprising arbitrating in the status data management means a conflict among conflicting status data provided by said plurality of language processing servers.

23. The method of claim 22, wherein said arbitrating comprises deleting status data having a low priority level among said conflicting status data.

24. The method of claim 23, wherein a priority level of status data is determined according to a predetermined priority order.

25. The method of claim 23, wherein a priority level of status data is determined according to a certainty level of status data determined in the course of language processing by a language processing server.

26. The method of claim 14, wherein status data indicating at least one of features of input data processed by a language processing server represents said at least one of features numerically or symbolically.

* * * * *